(12) United States Patent
Schloemer

(10) Patent No.: US 12,081,310 B2
(45) Date of Patent: Sep. 3, 2024

(54) SYSTEMS AND METHODS FOR CREATING RADIO ROUTES AND TRANSMITTING DATA VIA ORBITING AND NON-ORBITING NODES

(71) Applicant: STAR MESH LLC, Princeton Junction, NJ (US)

(72) Inventor: Gerald R. Schloemer, Round Lake, IL (US)

(73) Assignee: STAR MESH LLC, Princeton Junction, NJ (US)

( * ) Notice: Subject to any disclaimer, the term of this patent is extended or adjusted under 35 U.S.C. 154(b) by 0 days.

(21) Appl. No.: 18/373,662

(22) Filed: Sep. 27, 2023

(65) Prior Publication Data
US 2024/0022316 A1    Jan. 18, 2024

Related U.S. Application Data

(62) Division of application No. 17/539,240, filed on Dec. 1, 2021.
(Continued)

(51) Int. Cl.
*H04B 7/185*    (2006.01)
*H04W 16/28*    (2009.01)
(Continued)

(52) U.S. Cl.
CPC ..... *H04B 7/18504* (2013.01); *H04B 7/18513* (2013.01); *H04W 16/28* (2013.01); *H04W 40/02* (2013.01); *H04W 84/18* (2013.01)

(58) Field of Classification Search
CPC ........... H04B 7/18504; H04B 7/18513; H04W 16/28; H04W 40/02; H04W 84/18
See application file for complete search history.

(56) References Cited

U.S. PATENT DOCUMENTS

| 3,017,777 A | 1/1962 | Haeussermann |
| 3,815,140 A | 6/1974 | Buehler et al. |

(Continued)

FOREIGN PATENT DOCUMENTS

| CN | 102027695 | 4/2011 |
| CN | 1728714 | 7/2011 |

(Continued)

OTHER PUBLICATIONS

Cox, Donald C., "Wireless Network Access for Personal Communications," IEEE Communications Magazine (Dec. 1992), pp. 96-115.
(Continued)

*Primary Examiner* — Bailor C Hsu
(74) *Attorney, Agent, or Firm* — David M. Quinlan, P.C.

(57) ABSTRACT

Space-based systems, methods, and apparatus transmit data between terrestrial nodes using route creation and data transmission protocols that establish radio routes that transmit data over long distances between large numbers of terrestrial nodes via one or more satellites and/or other types of non-terrestrial aerial nodes. One approach uses satellites in stochastic orbits, in which some of the satellites receive and transmit signals simultaneously in different frequency bands to more readily create optimum radio routes for data transmissions between terrestrial nodes. Other approaches use route creation and data transmission protocols that increase the number of terrestrial nodes supported by the system. Still another approach uses a multi-level system in which drones and/or balloons service local areas while longer distance data transmissions are supported by one or more layers of satellites in cohorts in uncontrolled orbits at different altitudes.

24 Claims, 13 Drawing Sheets

Related U.S. Application Data

(60) Provisional application No. 63/182,341, filed on Apr. 30, 2021, provisional application No. 63/136,664, filed on Jan. 13, 2021, provisional application No. 63/132,026, filed on Dec. 30, 2020, provisional application No. 63/120,600, filed on Dec. 2, 2020, provisional application No. 63/120,409, filed on Dec. 2, 2020.

(51) Int. Cl.
*H04W 40/02* (2009.01)
*H04W 84/18* (2009.01)

(56) References Cited

U.S. PATENT DOCUMENTS

| | | | |
|---|---|---|---|
| 4,937,822 | A | 6/1990 | Weddle et al. |
| 4,965,850 | A | 10/1990 | Schloemer |
| 5,274,840 | A | 12/1993 | Schwendeman |
| 5,303,286 | A | 4/1994 | Wiedeman |
| 5,410,728 | A | 4/1995 | Bertiger et al. |
| 5,551,624 | A | 9/1996 | Horstein et al. |
| 5,566,354 | A | 10/1996 | Schloemer |
| 5,574,968 | A | 11/1996 | Olds et al. |
| 5,604,920 | A | 2/1997 | Bertiger et al. |
| 5,716,029 | A | 2/1998 | Spitzer et al. |
| 5,757,784 | A | 5/1998 | Liebowitz et al. |
| 5,793,842 | A | 8/1998 | Schloemer et al. |
| 5,812,545 | A | 9/1998 | Liebowitz et al. |
| 5,959,999 | A | 9/1999 | An |
| 6,208,312 | B1 | 3/2001 | Gould |
| 6,219,003 | B1 | 4/2001 | Chandler |
| 6,295,283 | B1 | 9/2001 | Falk |
| 6,404,769 | B1 | 6/2002 | Kapoor |
| 6,459,899 | B1 | 10/2002 | Schloemer |
| 6,775,251 | B1 | 8/2004 | Wiedeman et al. |
| 6,823,170 | B1 | 11/2004 | Dent |
| 6,985,454 | B1 | 1/2006 | Wiedeman et al. |
| 7,292,186 | B2 | 11/2007 | Miller et al. |
| 7,502,382 | B1 | 3/2009 | Liu et al. |
| 7,925,167 | B1 | 4/2011 | Kozubal et al. |
| 8,634,414 | B2 | 1/2014 | Leong et al. |
| 8,816,933 | B2 | 8/2014 | Scott et al. |
| 8,918,047 | B1 | 12/2014 | Teller et al. |
| 9,035,839 | B2 | 5/2015 | Scott et al. |
| 9,596,024 | B2 * | 3/2017 | Chang ............... H04W 24/02 |
| 9,748,989 | B1 | 8/2017 | Freedman et al. |
| 9,882,632 | B1 | 1/2018 | Fang |
| 10,063,309 | B2 | 8/2018 | Laufer et al. |
| 10,084,536 | B1 | 9/2018 | Schloemer |
| 10,084,615 | B2 | 9/2018 | Hong et al. |
| 10,085,200 | B1 | 9/2018 | Schloemer |
| 10,116,377 | B2 * | 10/2018 | Lohman ............... H04B 7/185 |
| 10,291,316 | B1 | 5/2019 | Schloemer |
| 10,419,103 | B1 * | 9/2019 | Perdew ............... H04L 45/02 |
| 10,439,956 | B1 * | 10/2019 | Salour .................. H04L 47/70 |
| 10,447,381 | B2 | 10/2019 | Schloemer |
| 10,594,027 | B1 * | 3/2020 | Arora ............... H04B 7/18597 |
| 10,742,311 | B2 | 8/2020 | Speidel et al. |
| 10,784,953 | B2 | 9/2020 | Schloemer |
| 10,979,136 | B2 | 4/2021 | Schloemer |
| 10,998,962 | B2 | 5/2021 | Schloemer |
| 11,038,586 | B2 | 6/2021 | Schloemer |
| 11,206,079 | B2 | 12/2021 | Schloemer |
| 11,356,921 | B2 | 6/2022 | Schloemer |
| 2005/0207375 | A1 | 9/2005 | Schiff |
| 2006/0023717 | A1 | 2/2006 | Trachtman et al. |
| 2007/0070939 | A1 | 3/2007 | Hottinen |
| 2007/0075896 | A1 | 4/2007 | Whitehead et al. |
| 2008/0056189 | A1 | 3/2008 | Hudson et al. |
| 2008/0219266 | A1 | 9/2008 | Agarwal et al. |
| 2008/0278397 | A1 | 11/2008 | Rao et al. |
| 2010/0128678 | A1 | 5/2010 | Thesling |
| 2010/0217879 | A1 | 8/2010 | Weiner |
| 2011/0116441 | A1 | 5/2011 | Wyler |
| 2011/0287791 | A1 | 11/2011 | Fujishima et al. |
| 2012/0218936 | A1 | 8/2012 | Fleeman et al. |
| 2013/0148250 | A1 | 6/2013 | Day et al. |
| 2013/0293415 | A1 | 11/2013 | Gutt et al. |
| 2014/0017992 | A1 | 1/2014 | Bigras et al. |
| 2014/0027576 | A1 | 1/2014 | Boshuizen et al. |
| 2014/0177522 | A1 | 6/2014 | Marshack et al. |
| 2014/0240497 | A1 | 8/2014 | Shefer |
| 2014/0266867 | A1 | 9/2014 | Liu et al. |
| 2015/0131512 | A1 | 5/2015 | Lauer et al. |
| 2016/0037434 | A1 | 2/2016 | Gopal et al. |
| 2016/0080072 | A1 | 3/2016 | Baudoin et al. |
| 2016/0112117 | A1 | 4/2016 | Platzer et al. |
| 2016/0365629 | A1 | 12/2016 | Yao et al. |
| 2017/0070939 | A1 | 3/2017 | Chong et al. |
| 2017/0155443 | A1 | 6/2017 | Haziz et al. |
| 2018/0084476 | A1 | 3/2018 | Kay et al. |
| 2018/0138968 | A1 | 5/2018 | Auer |
| 2018/0156924 | A1 | 6/2018 | Reedy et al. |
| 2018/0323863 | A1 | 11/2018 | Bournes |
| 2018/0359670 | A1 | 12/2018 | Fang |
| 2019/0305848 | A1 | 10/2019 | Laurent |
| 2019/0353799 | A1 | 11/2019 | Grant et al. |
| 2020/0024012 | A1 | 1/2020 | Fortezza |
| 2022/0173795 | A1 | 6/2022 | Schloemer |
| 2022/0376777 | A1 * | 11/2022 | Bode ............... H04B 7/18526 |

FOREIGN PATENT DOCUMENTS

| | | |
|---|---|---|
| CN | 103281115 | 9/2013 |
| CN | 102301774 | 4/2014 |
| CN | 104661276 A | 5/2015 |
| CN | 106788682 A | 5/2017 |
| EP | 1523062 | 4/2005 |
| IN | 4263/CHE/2013 | 3/2015 |
| IN | 106664507 | 12/2020 |
| JP | H03-139927 | 6/1991 |
| JP | 677889 | 3/1994 |
| WO | 2009123112 | 10/2009 |
| WO | 2009139778 | 11/2009 |
| WO | 2015184055 | 12/2015 |
| WO | 2016060954 | 4/2016 |
| WO | 2018039292 | 3/2018 |
| WO | 2019118245 | 6/2019 |

OTHER PUBLICATIONS

Satellite Systems Engineering in an IPV6 Environment, Minoli, Daniel, CRC Press, Boca Raton, FL (2009), pp. 78-80.
Chabot, J. A., "A Spherical Magnetic Dipole Actuator for Spacecraft Attitude Control," Thesis for M.S. in Aerospace Engrg. Sciences, Univ. of Colorado, 2015.
"Iridium Satellite Constellation," Wikipedia, https://en.wikipedia.org/wiki/Iridium (last visited May 9, 2017).
"Project Loon," Wikipedia, https://en.wikipedia.org/wiki/Project_Loon (last visited Sep. 27, 2017).
Wade, P., "Multiple Reflector Dish Antennas," copyright 2004.
International Search Report in PCT/US2017/48110, dated Nov. 3, 2017.
Invitation to Pay Additional Fees dated Nov. 14, 2018, in PCT appln. No. PCT/US2018/053002.
International Search Report and Written Opinion dated Jan. 22, 2019, in PCT appln. No. PCT/US2018/053002.
International Search Report and Written Opinion dated Apr. 8, 2019, in PCT appln. No. PCT/US2018/064041.
International Search Report and Written Opinion dated Nov. 12, 2019, in PCT appln. No. PCT/US2019/041428.
Supplementary European Search Report dated Feb. 25, 2020, in EP appln. No. 17844319.8 (PCT/US2017/048110).
Chakraborty, D., "Survivable Communication Concept Via Multiple Low Earth-Orbiting Satellites," IEEE Transactions on Aerospace and Electronic Systems, vol. 25, No. 6 (Nov. 1989), pp. 879-889.
Chung, Soon-Jo, et al., "Review of Formation Flying and Constellation Missions Using Nanosatellites," Journal of Spacecraft and Rockets, vol. 53, No. 3, pp. 567-578 (May-Jun. 2016).

(56) References Cited

OTHER PUBLICATIONS

Qu, et al., "LEO Satellite Constellation for Internet of Things," IEEE Access, vol. 5, pp. 18391-18401, Digital Object Identifier 10.1109/ACCESS.2017.2735988, first pub. Aug. 4. 2017 (Sep. 27, 2017).
EPO Office action in EP Appln. No. 18860787.3-1215, May 21, 2021.
Official Action in Chinese Appln. No. 2018800627936, dated Jul. 28, 2021.
Supplementary European Search Report, Appl. No. 19834930.0 (PCT/US2019/041428), Mar. 1, 2022.
Tubbal, F.E., et al., "A Survey and Study of Planar Antennas for Pico-Satellites," IEEE Access, vol. 3 (Dec. 17, 2015), pp. 2590-2612.
Wang, M., et al., "Stochastic Performance Analysis for LEO Inter-Satellite Link Based on Finite-State Markov Chain Modeling," 2015 4th Int'l Conf. on Computer Science & Network Technology (2015), pp. 1230-1235.
Madni, M.A.A., et al., "Energy-Aware Routing for CubeSat Swarms," Int'l Jour. of Digital Information & Wireless Communications, Soc. of Digital Information & Wireless Communications, vol. 8(3) (2018), pp. 150-155.
First Examination Report in Indian Application No. 202127005944 (PCT/US2019/041428), Sep. 27, 2022.
Zeng, Y., et al.,"Wireless Communications with Unmanned Aerial Vehicles: Opportunities and Challenges," Dept. of Electrical and Computer Engrg., Natl. Univ. of Singapore, Feb. 12, 2016.
Otto, A., et al. "Optimization approaches for civil applications of unmanned aerial vehicles (UAVs) or aerial drones: A survey," Networks, vol. 72 (Mar. 23, 2018), pp. 411-458, Wiley Periodicals, Inc.
"CubeSat," Wikipedia, https://en.wikipedia.org/wiki/CubeSat (last visited Jun. 23, 2019).

* cited by examiner

SYSTEMS AND METHODS FOR CREATING RADIO ROUTES AND TRANSMITTING DATA VIA ORBITING AND NON-ORBITING NODES

CROSS-REFERENCE TO RELATED APPLICATIONS

This application claims benefit of the assignee's U.S. provisional application No. 63/120,409 filed Dec. 2, 2020, U.S. provisional application No. 63/120,600 filed Dec. 2, 2020, U.S. provisional application No. 63/132,026 filed Dec. 30, 2020, U.S. provisional application No. 63/136,664 filed Jan. 13, 2021, and U.S. provisional application No. 63/182,341 filed Apr. 30, 2021, the entire contents of all of which are incorporated by reference as part of the present disclosure as if set out in full herein. Also incorporated by reference as part of the present disclosure as if set out in full herein is the assignee's U.S. Pat. No. 10,979,136 issued Apr. 13, 2021 ("the '136 patent), and the assignee's Pub. No. US2022/0173795 published Jun. 2, 2022, on pending application Ser. No. 17/539,236 entitled "Satellite Mesh Systems and Methods for Creating Radio Routes Between Moving Users," filed concurrently herewith on Dec. 1, 2021 ("the '795 publication").

BACKGROUND

The space-based systems, methods, and apparatus described herein relate to transmitting data from one terrestrial node to another or from one non-terrestrial aerial node to another, and more particularly, to communications systems and methods using novel route creation and data transmission protocols for establishing radio links in a system that can transmit data between large numbers of terrestrial nodes via one or more satellites and/or other types of non-terrestrial aerial nodes over long distances.

DESCRIPTION OF RELATED ART

The assignee's U.S. Pat. Nos. 10,084,536, 10,085,200, 10,291,316, 10,447,381, and No. 10,979,136, describe numerous innovative satellite-based radio communication systems and methods. In particular, the systems and methods disclosed herein extend the route creation and data transmissions systems and methods disclosed in U.S. Pat. No. 10,979,136. The assignee's patents mentioned here can be referred to for additional background information relating to subject matter described herein.

Certain preferred implementations of the systems described in the assignee's referenced patents involve deploying a constellation of 100 or more satellites in low-earth orbits at altitudes as low as 200-300 miles, and in some cases even lower. One aspect of the approaches described in those patents is their efficacy in space-based systems using small, lightweight satellites in unconstrained orbits without precision attitude control. This approach turns on its head the conventional wisdom that inter-satellite communications require maintaining the satellites in fixed orbits at tightly controlled attitudes. The assignee's systems eliminate the need for rockets and rocket thrusters and other mechanical contrivances, which translates to lighter, smaller, and cheaper satellites, with the potential to reduce by orders of magnitude the overall cost of implementing worldwide satellite-based communication systems.

The assignee's advanced space-based systems described herein employ a variety of satellite deployment strategies, route creation protocols, satellite constructions, antenna configurations, and terrestrial node arrangements that enable data transmission between large numbers of widely dispersed terrestrial sites. Although the assignee's previous patents focused principally on internodal communications via a constellation of stochastically distributed satellites without rigid attitude control, the principles of route creation and data communication described herein are applicable to virtually any communication system using a wide variety of aerial nodes, including satellites, balloons, and drones, and node deployment strategies for interconnecting virtually any type of terrestrial node, fixed or movable, including personal devices such as smartphones.

SUMMARY OF THE DISCLOSURE

One object of the systems and methods described herein is to improve the efficiency and efficacy of route creation protocols and data transmission techniques and thereby enhance the practicability and performance of the space-based, multi-node communications systems and methods disclosed in the assignee's patents referenced above.

The enhanced approaches described herein are applicable to any communication system using satellites to support communications between terrestrial locations. For example, the route creation protocols and data transmission techniques can be applied to systems in which the satellites in a constellation are in fixed orbits, or have onboard attitude control, or are deployed at different altitudes, or know their positions relative to the earth's surface or relative to each other, or any combination of such configurations.

Numerous examples of satellite constructions that can implement the routing and data transmission protocols are described in detail below. The following is just a partial listing of applicable satellite constructions and configurations that can be used to implement the disclosed systems and methods:

A satellite as depicted in FIG. 3 of the '136 patent, without attitude control and solar panels 14 extending perpendicularly from the satellite surface to maximize exposure to the sun as the satellite changes orientation while orbiting.

A satellite as depicted in FIG. 3 of the '136 patent with solar panels flush with the satellite surface to reduce atmospheric drag, particularly for satellites in low-earth orbits (LEO) and/or very low earth orbits (VLEO).

A satellite as depicted in FIG. 3 of the '136 patent with solar panels flush with the satellite surface and openings for antennas recessed below the outer skin of the satellite and covered by a protective shield to reduce the risk of antenna damage from space debris or small meteorites.

A CubeSat with a number of units appropriate to the operational characteristics of the satellite; FIG. 21 of the '136 patent depicts a 6U CubeSat, but other sizes, smaller than that and up to and perhaps exceeding 8U sections can be used in the various communications systems described in detail below. Certain applications described herein can be implemented by a 2U CubeSat with electronic components in one unit and outward-facing antennas on the five sides of the adjacent unit.

A satellite as described in the assignee's U.S. application Ser. No. 17/367,663 with a streamlined shape designed to maximize time in orbit in the absence of onboard propulsion.

Various satellite configurations in use now, or planned for the future, such as the satellites used in Iridium® systems, 500-pound communication satellites believed to be in planning and experimental stages overseen by Elon Musk, and a 750-pound satellite believed to be under construction by Blue Canyon Technologies for use by the MethaneSAT subsidiary of the Environmental Defense Fund.

Another feature of the systems and methods described herein is their adaptability for use with numerous antenna constructions, of which the following is a partial listing:

Parabolic antennas with their reflectors mounted wholly within a spherical satellite in the fashion depicted in FIG. 2 of the '136 patent.

Antennas in CubeSat satellites with one or more units, having one or more antennas per unit, per FIG. 21 of the '136 patent.

The types of antenna combinations utilized in Iridium® satellites.

The large antenna structures used to transmit signals from high altitude geosynchronous satellites.

Multi-feed antennas shown in FIG. 19 of the '136 patent.

The versatility of the systems and methods described in detail further below also support satellite communications between a wide variety of terrestrial nodes, including but not limited to the following:

Iridium® style satellite phones.

Multi-antenna ground stations described in the assignee's patents.

Antennas mounted on top of public transportation vehicles for serving on-board passengers.

Personal communication devices such as smartphones, whether located outside or inside a building, that can take advantage of the shorter propagation paths provided by LEO and VLEO satellites.

With "hot spot" connectivity in which base sites are ground-based or mounted on drones or balloons. The systems and methods described herein can also serve multiple users via various arrangements, including Wi-Fi and cellular service. (Applications such as drone- and balloon-mounted base sites can use upward and downward facing antennas.)

The approaches described herein can be advantageously applied in all of the above scenarios. They also enable communications using a constellation of stochastically distributed satellites, which may or may not have active attitude control, that rely on probabilities to create radio links via antenna pairing between satellites and between satellites and ground stations. The detailed description of various embodiments that follows below includes a variety of ways for facilitating route creation and data transmissions in such a system with a large numbers of ground stations. It will be appreciated that a system including a constellation of stochastically distributed satellites can be used in combination with other space-based systems such as those referred to in the previous paragraphs. In addition, the system can also be implemented using other types of aerial nodes, such as balloons and drones, either instead of or in addition to one or more satellites.

Many of the different aspects and features of the system nodes, particularly those comprising the satellite embodiments and the satellite-based routing protocols described herein, can be used in various combinations depending on the requirements and purposes of a particular communications system. That is, the route creation and data transmission protocols described in detail further below will support links between any satellite (or other aerial node) with a transceiver and two antennas. Examples include but are not limited to the following:

Between satellites in polar orbits like those in the system proposed by Kepler Communications Inc. and satellites of other designs in other types of orbits.

Between an Iridium-style set of satellites and one or more geostationary satellites such as those designed by Viasat Inc.

Between different satellites in large scale systems such as the SpaceX Starlink system and Amazon's Kuiper system, or between satellites in one such system with satellites in the other.

Between satellites such as those described in detail below with a variety of other types of satellites, including those being designed by SpaceX and Amazon.

Between satellites such as those described in detail below with different satellites having any of the disclosed configurations, with such satellites at different orbital altitudes, or with satellites by any of the parties mentioned (Iridium, SpaceX, or Amazon).

Between communication satellites like any of those mentioned and a high altitude aircraft powered by solar panels being developed as a "pseudosatellite" by Aero-Vironment, Inc., described at www.avinc.com/about/haps.

This Summary is provided solely to introduce in a simplified form a selection of concepts that are described in detail further below. It is not intended necessarily to identify key or essential and novel features of the subject matter described herein, nor is it intended to be used an aid in determining the scope of any claim directed to such subject matter.

The detailed description of space-based communications systems is presented first in the context of their utility as applied to a constellation of multiple, stochastically distributed satellites in unconstrained orbits without active attitude control. However, the concepts, protocols, and constructions described in that context also have broad application to other satellite constructions and deployment strategies, as well as having utility in a wide variety of other space-based methods of creating radio routes and transmitting data. Further applications of such concepts, protocols, and constructions in different contexts are also described herein.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

FIG. 1, comprising

FIG. 9, comprising

Figure 1A:
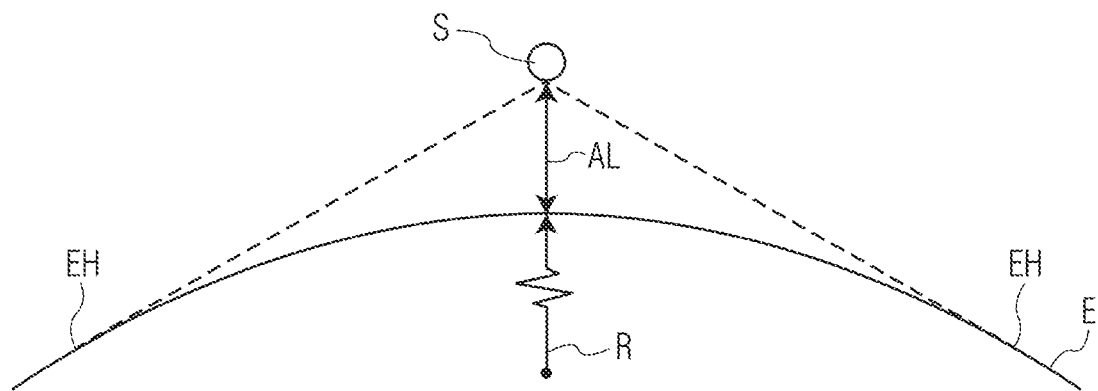
FIGS. 1A and 1B, illustrates geometric principles relevant to the use of satellites in low-earth orbits in space-based communications systems disclosed and claimed herein.

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF PREFERRED EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein.

The following detailed description of certain preferred embodiments of the subject matter herein is organized as follows:

I. Definitions
II. Basic Communication Systems Principles and Aerial Node Designs
III. Satellite Design: Antenna Configuration and Onboard Control Circuitry
IV. Route Creation in Orbiting/Non-Orbiting Communication Systems
   A. General Description of Exemplary Satellite Deployments
   B. Route Creation Using Frequency Band Separation
   C. Route Creation in Systems with up to 100 Ground Stations
   D. Route Creation in Systems with up to 300 Ground Stations
   E. Route Creation with Satellites/Drones/Balloons at Different Altitudes
     1. System Arrangement
     2. Local and Wide Area Data Transmission
V. Summary and Conclusion

I. DEFINITIONS

The description that follows uses numerous terms intended to have specific meanings.

One concept central to certain embodiments of the systems described and claimed herein is that the satellites can be "stochastically distributed" or in "unconstrained orbits." These terms are both related to the term "random orbits" used in the assignee's referenced U.S. Pat. No. 10,084,536, 10,085,200, 10,291,316, 10,447,381, and 10,979,136. The intended meaning of these terms is set out in detail at column 4, line 59, to column 5, line 29, of the '136 patent. In addition, the satellites used in communications systems described herein may employ "passive attitude control" or its related concept "without active attitude control." The specific meanings of these terms are set out in detail in the '136 patent at column 5, lines 30-55.

Other terms used in the description that follows are "data communications" and "routing messages." A "data communication" comprises content (digital or otherwise) sent over a radio link between satellites or between a satellite and a ground station, unless otherwise indicated explicitly or by context. While not limited as such, the systems described herein are particularly well suited for the transmission of data in packets, defined here in the generally accepted sense as a collection of digital data with a portion representing the content of the transmission (sometimes referred to as the "payload"), and a control portion (sometimes referred to as a "header" or "trailer"), which contains information enabling the payload to be delivered successfully, such as source and destination addresses, error detection codes, and sequencing information. A routing message (also referred to as an "information signal" in some contexts) is a radio signal sent from a node in the system (ground or aerial node) that contains information or has a property that can be used for determining the suitability of the node for inclusion in a multi-link radio route. A given radio signal can include both a routing message and a data communication. Throughout the description herein, the term "radio" is not limited to references to electromagnetic radiation in frequencies commonly referred to as radio waves. It is meant to encompass electromagnetic radiation of any frequency capable of transmitting information, including light, microwaves, VHF ("very high frequency"), UHF ("ultrahigh frequency"), etc. See also the '136 patent at column 5, line 56, to column 6, line 14.

A "node" is a physical object with one or more transceivers for transmitting radio signals intended to be received by other nodes and for receiving radio signals transmitted from other nodes. Nodes can be terrestrial ground stations ("ground nodes") or transceivers above the earth's surface ("aerial nodes"). Aerial nodes include, but are not limited to, satellites orbiting the earth, balloons, drones, and airships (lighter-than-air aircraft having propulsion and steering systems). Balloons and drones can advantageously provide nodes at altitudes above the flight paths of commercial aircraft (greater than 10 miles). A ground node can be a structure fixed to the earth's surface, one example being a structure with one or more antenna arrays. Another example of a ground node is a mobile radio device carried by a user in a personal digital device, a vehicle, an airplane. That is, the terms "ground node" or "terrestrial node" are used in the same sense as in paragraph 0021 of the '795 publication.

The '136 patent discusses at column 6, lines 29-58, the intended meanings and proper interpretation of terms used in connection with control circuitry and components described and depicted in the various figures herein. Also described are proper interpretations of terms utilized or incorporated in an electronic computer system and components thereof capable of performing the functions ascribed to it in the description that follows. It includes the proper interpretation of terms such as "component," "module," "system," "apparatus," "interface," "module," "component," and the like.

II. BASIC COMMUNICATION SYSTEMS PRINCIPLES AND AERIAL NODE OPTIONS

Figure 1B:
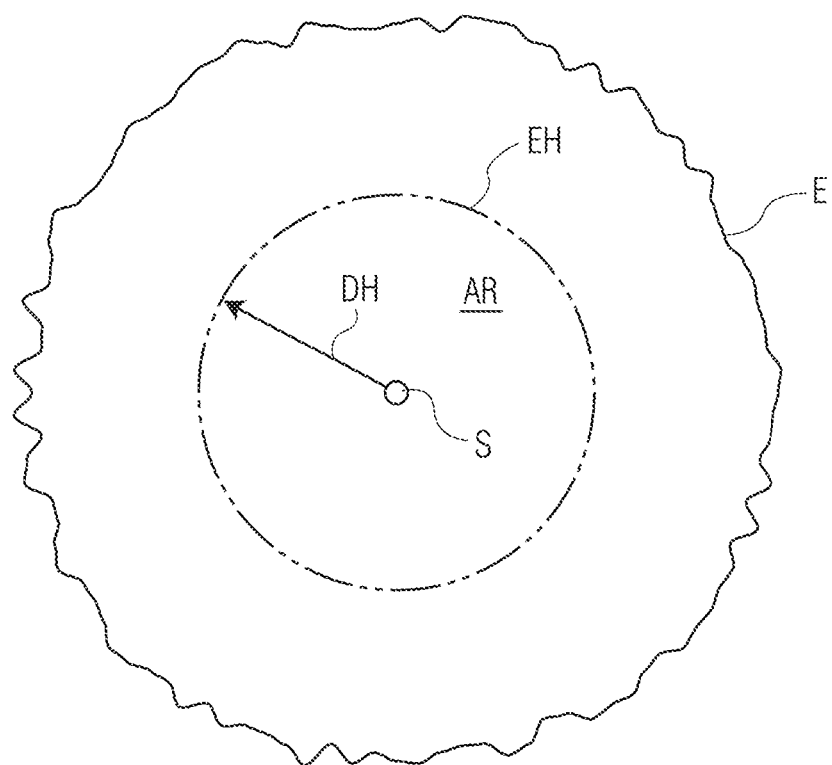

One of the important parameters in a communication system in which an aerial node, such as a satellite S, exchanges radio signals with ground nodes and/or other satellites is the distance EH from the satellite to the horizon on the earth's surface E. FIGS. 1A and 1B illustrate the relationship between the altitude of an aerial node such as a satellite S and its surface "footprint" defined by the distance from the satellite to the horizon. A ground station beyond that distance cannot see the satellite and thus cannot exchange radio signals with it. If the satellite S is at an altitude AL of 200 miles, it will have a footprint on the earth's surface relating to the distance DH=1,280 miles to the horizon EH. This is the radius within which a satellite will theoretically be in line of sight of a point on the ground. The satellite's footprint (the area AR of the earth's surface visible to the satellite) is $\pi*DH^2 \approx 5,100,000$ sq. mi. (taking the radius R of the earth as 4,000 miles). By the same token, the distance two satellites in circular orbits at the same altitude can see each other is roughly twice the distance DH. One of the challenges in any satellite-based communication system is to design the satellites and ground stations so that their respective antennas can be paired to create radio links over these large distances. See also column 6, lines 29-58, of the '136 patent.

For reference in the descriptions of various embodiments that follow, the following table sets out for satellites of different altitudes their distances to the horizon (DH), and footprints. It also includes corresponding information for non-orbiting aerial nodes such as drones and balloons. To avoid interfering with commercial aviation, drones and balloons must be above about 10 miles; by FAA regulation, drones can also fly below 400 feet as long as they are not in otherwise restricted airspace, such as near an airport.

TABLE 1

| Altitude - AL (miles) | Distance to Horizon - DH (miles) | Footprint - $\pi*DH^2$ (sq. mi.) |
|---|---|---|
| ≤400 ft. (drone) | | |
| 10-20 (drone*/balloon) | 280 ≤ DH ≤ 400 | 250,000 ≤ FP ≤ 500,000 |
| 100 | 900 | 2,500,000 |
| 200 | 1,280 | 5,100,000 |
| 400 | 1,830 | 10,500,000 |
| 500 | 2,000 | 12,500,000 |
| 800 | 2,600 | 21,200,000 |
| 1000 | 3,000 | 28,300,000 |
| 22,230 (Geostationary) | 26,000 | $2.1 \times 10^9$ |

*Drones may have operational altitude limits due to decreased atmospheric density.

This table reveals one of the trade-offs involved in designing a satellite-based communication system, in that the distance to the horizon and the corresponding footprint increase as the node altitude increases, but the strength of the radio signals between the aerial nodes and the ground is attenuated as the altitude increases. This and other design considerations are discussed in the sections that follow.

III. SATELLITE DESIGN: ANTENNA CONFIGURATION AND ONBOARD CONTROL CIRCUITRY

Figure 2:
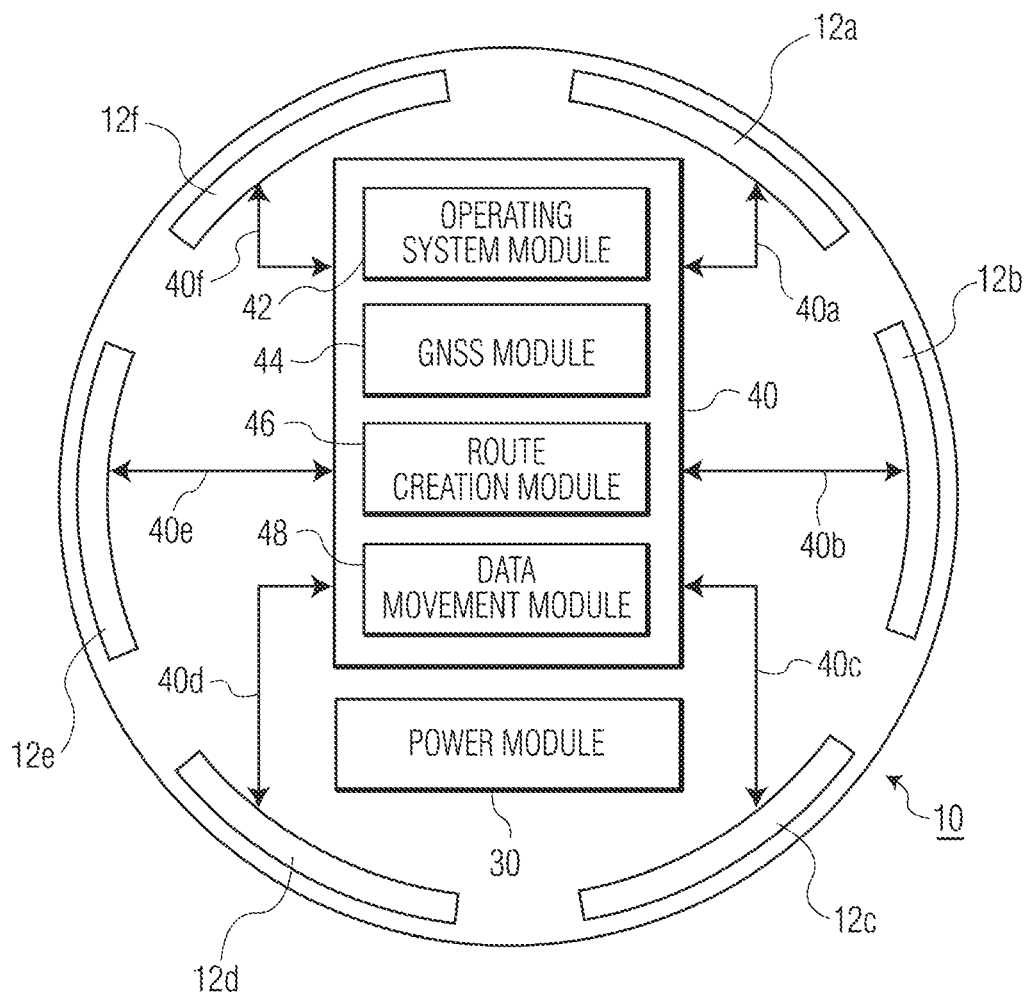
FIG. 2 is a schematic representation of various operational components of a satellite suitable for use in the systems described herein.

FIG. 2 illustrates schematically various components housed by a satellite 10 (linking node) for creating a radio route capable of transmitting and receiving data transmissions to and from other nodes. As those skilled in the art will readily recognize, in the descriptions of this and other embodiments and aspects of the communications systems comprising the subject matter disclosed and claimed herein, the control circuitry and components described and depicted in the various figures are meant to be exemplary of any electronic computer system capable of performing the functions ascribed to them. Such a computer system will typically include the necessary components described in the '136 patent at column 9, line 59, to column 10, line 10.

The satellite 10 includes a plurality of antenna modules 12a, 12b, 12c, 12d, 12e, and 12f, intended as a schematic representation of all of the antenna modules onboard the satellite 10, for transmitting and receiving radio signals. This schematic depiction is intended to convey the principle of operation of the present embodiment whereby the plurality of antenna modules in combination will be capable of transmitting and receiving radio signals to and from a node in multiple radial directions. The antennas can assume a variety of configurations and operating characteristics, some of which are described above. More specific examples are described in connection with the satellite constructions depicted in FIGS. 12-15 and 18-21 of the '136 patent and in the assignee's U.S. application Ser. No. 17/367,663.

A power module 30 includes rechargeable batteries that provide steady-state power to the satellite components. Solar panels (not shown in FIG. 2) generate electricity for maintaining a charge on the batteries. The solar panels can be implemented in a number of ways, some examples of which are described in connection with the satellite constructions depicted in FIGS. 12-14 and 18 of the '136 patent and in the assignee's U.S. application Ser. No. 17/367,663. In addition to the power module the satellite includes a central processing unit 40 with an operating system module 42 that stores operational software for controlling the various functions of the satellite. As shown in FIG. 2, the CPU 40 is operatively connected to all of the antenna modules 12 via power and data links 40a, 40b, 40c, 40d, 40e, and 40f.

FIG. 2 also illustrates three main operational modules under the control of the operating system module 42. A Global Navigation Satellite System (GNSS) module 44 communicates with a global navigation satellite system, examples of which are disclosed in the '136 patent at column 10, line 46, to column 11, line 4. This module enables the satellite to determine its position relative to the earth's surface in the manner employed by known global navigation satellite systems. It also provides a means to implement a master system clock to control the timing of signals exchanged by the satellites, as described below. Radio signals exchanged between system nodes via the antenna modules 12 are used by a route creation module 46 that includes antenna pairing circuitry for executing logic discussed further below to create a radio route comprising radio links supporting data communications between two or more nodes. A data movement module 48 includes data transmission circuitry that controls the transmission of data (content) between nodes as also discussed further below in more detail. As suggested above, the illustration in FIG. 2 of separate modules for route creation and data movement does not necessarily imply that identifying radio links to be used in a radio route and transmitting data between linked nodes are other than part of a more or less unitary process of creating a preferred radio route for transmitting data communications from one satellite to another or between satellites and ground nodes.

Another important feature of certain systems and methods described herein is that the satellites can operate without active onboard attitude control. However, certain constructions for providing passive attitude control to stabilize satellite attitude within certain limits can improve the operation of the system, without adding materially to the cost of making and launching the satellites. Thus, in one basic form, the satellites can be permitted to orbit without regard to their angular orientation. It is expected that satellites can be deployed from a launch vehicle such as a space station or the like. It may be preferable in some implementations to attempt to deploy them with as little angular velocity as possible, but in certain embodiments no special effort is required in that regard. Some system embodiments described herein can create radio routes even if the satellites tumble as they orbit, meaning that they need not be in a known, predetermined orientation (attitude). The satellites can also include a measure of attitude stabilization within certain limits, as described in connection with the exemplary constructions described in connection with FIGS. 16 and 17 of the '136 patent and in the assignee's U.S. application Ser. No. 17/367,663. Eliminating the need for heavy and costly onboard equipment such as rocket thrusters for changing or maintaining a satellite's location or attitude can further reduce satellite weight, manufacturing cost, and launch expense.

IV. ROUTE CREATION IN ORBITING/NON-ORBITING AERIAL NODE COMMUNICATIONS SYSTEMS

This section discusses some examples of systems that support creating radio routes for data communications between terrestrial ground nodes (sometimes referred simply as "ground stations") via one or more satellites in a constellation of multiple stochastically distributed satellites orbiting the earth, via a combination of satellites and non-orbiting aerial nodes, and via non-orbiting aerial nodes alone. The assignee's referenced patents and applications describe various embodiments of such systems and methods, but the present discussion relates primarily to route creation and data communications between ground stations with plural directional antennas capable of transmitting and receiving radio signals around substantially the entire semi-spherical space above the surface of the earth. Using as an example a satellite-based system, the satellites comprise a plurality of directional antennas capable of transmitting and receiving radio signals around substantially the entire spherical space surrounding the satellite. Route creation involves sending initial information signals from all of the antennas of all of the ground stations, and then transmitting routing messages from all of the antennas of a satellite that receives an initial information signal. Since the antennas are directional, usually only one antenna in a satellite will receive an initial information signal from a given ground station. The satellite stores the identity of the antenna on which it received the initial information signal and the address of the ground station that sent it. The routing messages transmitted from the satellite include the address of the sending ground station and a quality of the initial information signal received at the satellite. (The concept of "quality" is discussed further below.) However, an important aspect of routing and data transmission methods described herein is that they are also applicable to systems using satellites maintained in particular orbits and attitudes.

Satellites that receive routing messages—usually only one from any given satellite for a given ground station—in turn save the address of the sending ground station contained in the received routing message and the antenna on which the routing message was received. They transmit from all of their antennas further routing messages that comprise information on the quality of the respective routing messages they have received and the address of the sending ground station. A ground station that receives a routing message (a "receiving ground station") from a satellite stores the antenna on which the routing message was received and its quality. When a receiving ground station receives routing messages on two antennas identifying different routes (that is, one via a different satellite or satellites) to the sending ground station, it typically selects the antenna to use for data transmissions to the sending ground station based on the quality information in the respective received routing message and the quality of the received routing message itself. The system is based on the principle of antenna reciprocity, whereby certain reception and transmission properties of a given antenna are identical, such as its radiation pattern and the value of its directivity. This allows links of a radio route to be assembled in one direction, from a first ground station toward a second ground station—and for data to be transmitted in the other direction, from the second ground station to the first.

A. General Description of Exemplary Satellite Deployments

Figure 3:
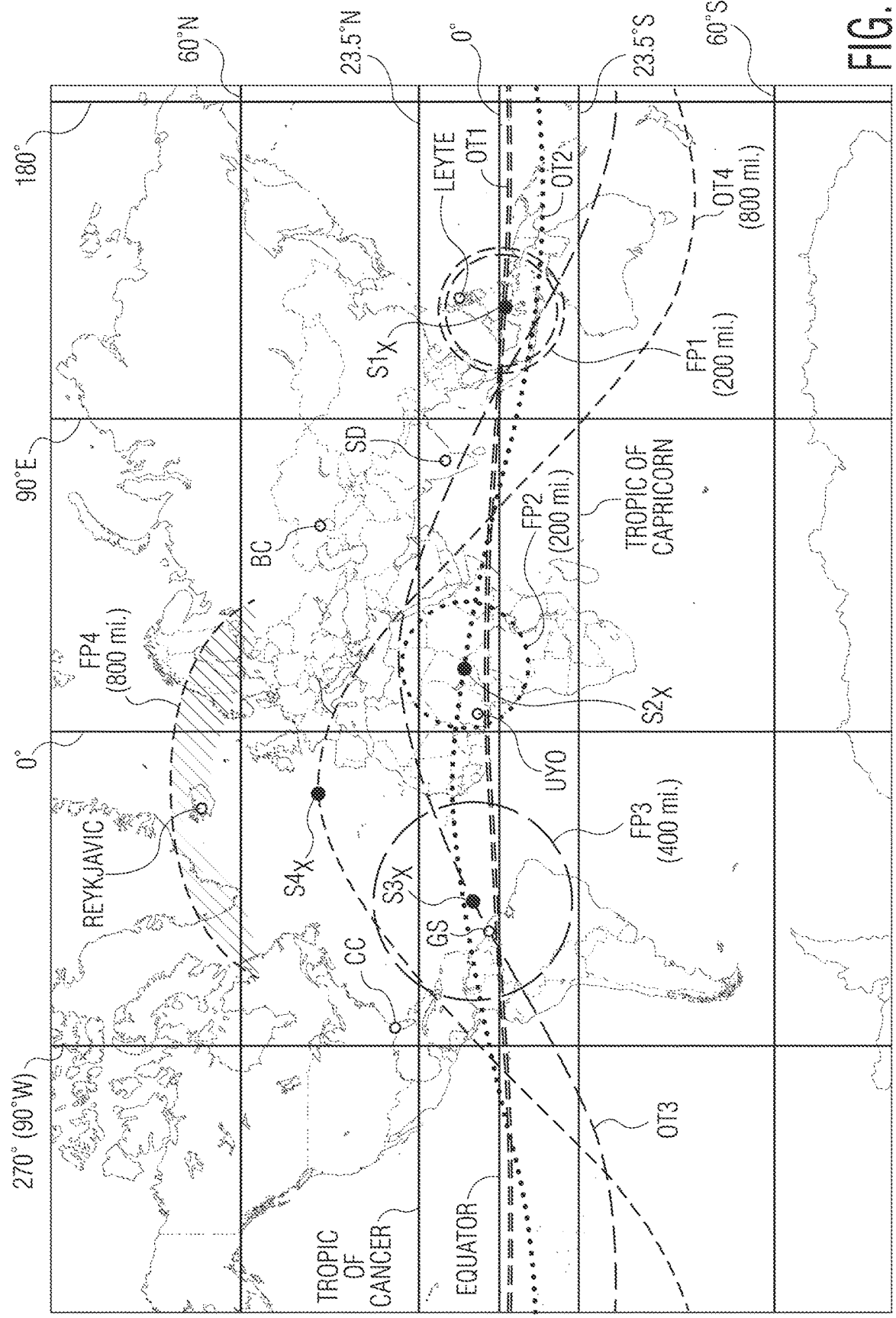
FIG. 3 comprises a Mercator projection of the earth showing the orbital paths of a constellation of stochastically distributed satellites like that shown in FIG. 2 deployed at various altitudes in low-earth orbits with different inclinations relative to the equator.

FIG. 3 illustrates various forms that a constellation of satellites, such as those just described above, can assume for implementing such a system. FIG. 3 is based on a standard Mercator projection of the earth showing the equator, the Tropic of Cancer, and the Tropic of Capricorn. FIG. 3 illustrates exemplary systems comprising multiple satellites at different altitudes and orbital inclinations. The drawing shows satellites in four orbital tracks having different inclinations. A first orbital track OT1 shown in a double-dash line represents a satellite $S1_X$ deployed into a 200-mile altitude circular orbit about the equator from launch site GS at 5° N lat.; a second orbital track OT2 shown in a dotted line represents a satellite $S2_X$ deployed into a 200-mile altitude circular orbit from launch site SD at 13° N lat.; a third orbital track OT3 shown in a long-dash line represents a satellite $S3_X$ deployed into a 400-mile altitude circular orbit from launch site CC at 28° N lat.; and a fourth orbital track OT4 shown in a short-dash line represents a satellite $S4_X$ deployed into a 800-mile altitude circular orbit from launch site BC at 45° N lat. It will be appreciated that these are meant to be examples of orbital tracks that satellites in the present system can assume. Further information on this figure is in the '136 patent at column 15, lines 33-59.

One consideration in systems using plural satellites in unconstrained, stochastic orbits is how many satellites are likely to be within sight of a given point on the earth's surface at any given time. To illustrate the statistical principles underlying such a system, consider a constellation of 100 satellites in the orbital path OT4 at an altitude of 800 miles. The satellites cover an area of the earth between 45° N lat. and 45° S lat. This is about 140,000,000 sq. mi., or roughly 70% of the earth's surface of about 200,000,000 sq. mi. The satellites in this orbital track have a footprint of about 21,000,000 sq. mi. (Table 1; 800-mile high orbit), represented by a short-dash line in FIG. 4. Thus, each satellite in orbital track OT4 in that swath will "cover" about 15% of the swath (21,000,000 sq. mi.÷140,000,000 sq. mi.), so that on average any one point on the surface that is about 2,500 miles (Table 1; DH=2,600 mi.) from the outer extent of the orbital path will "see" at least 15 of the 100 satellites (100×0.15). Since establishing communications with the stochastically distributed satellites is based on probabilities, the system considers that the chance that a satellite will not be visible from any point in that region is 85%. However, in a constellation of 100 satellites, the probability that any particular ground location in that region will not be able to see at least one satellite is only $0.85^{100}$ (that is, about one 11,000,000). Locations on the surface closer to the northern and southern boundaries of the orbital swath (in this example 45° N lat. and 45° S lat.) will see fewer satellites. For example, a location on the boundary of the swath will see only half as many satellites on average at any one time, but the probability of making connections with ground stations in such locations is still sufficient to support the immediate creation of multiple satellite-to-ground radio links with those ground stations. In addition, the system is fully scalable by adding satellites to the constellation to increase the probabilities of immediate creation of a radio link between a satellite and any given ground station.

An important factor in assembling a multi-satellite radio route is the number of other satellites that any given satellite can "see." Referring to FIG. 1, a satellite in any orbital path can theoretically see other satellites over the horizon EH up to a distance of 2×DH. In the example in the preceding paragraph, each satellite in an 800-mile orbit can theoretically "see" about 5,200 miles over the horizon (2×2600 mi.), but interference from ground structures at the horizon may reduce that distance, so that 5,000 miles would be a more conservative estimate. Accordingly, a first satellite receiving an initial information signal from a sending ground station can on average see a very large number of other satellites within the swath covered by the constellation (extending between 45° N lat. and 45° S lat.) that can potentially receive routing messages from the first satellite, and satellites receiving those routing messages will be able to send further routing messages to a large number of other satellites within the swath up to 5,000 miles away, and so on. An object of the satellite configurations, routing protocols, ground station constructions, and system architectures described herein is to take advantage of this property to ends to be described. Other important characteristics of the disclosed systems and methods include, but are not limited to, the ability to be scaled up in complexity by incorporating more satellites and other types of aerial nodes at different altitudes, the ability to accommodate a wide variety of aerial node deployment strategies, and the ability to compensate for aerial node attrition, such as by orbital decay and node failure. These and other characteristics are described in the '136 patent at column 16, lines 40-59.

B. Route Creation Using Frequency Band Separation

The routing methods described in the above introductory paragraphs of this section IV rely on quickly establishing radio links between system nodes, not only between ground station nodes and stochastically distributed aerial nodes (such as satellites), but also between the aerial nodes themselves. In addition, many applications, particularly telephony, require that a destination ground station be capable of supporting duplex operation by simultaneously receiving and transmitting radio signals. Likewise, the aerial nodes must also be capable of duplex operation in order to support duplex operation between ground nodes.

Duplex operation can be effected by having different "types" of nodes. In one embodiment each node has antennas that simultaneously transmit radio signals in one frequency band and receive signals in a different frequency band. The assignee's U.S. Pat. No. 10,447,381 discloses using different types of nodes. Satellites were designated as Type A nodes, with antennas that transmitted in a first frequency band and received in a second frequency band, and the ground stations were designated as Type B nodes, with antennas that received in the first frequency band and transmitted in the second frequency band. With satellites that cannot communicate with each other, only a two-hop "bent pipe" route could be created via a ground-satellite-ground connection. In a modification to permit satellite-to-satellite radio links, the patent describes adding a certain number of Type B satellites that could communicate with Type A satellites, but they would not be able to communicate with the Type B ground stations.

An exemplary system that will permit effective duplex operation between ground stations in the United States will be described in connection with FIGS. 4 and 5. In this embodiment 200 stochastically distributed satellites orbit the earth at an altitude of 800 miles in a swath defined by the northernmost and southernmost extent of the orbital path OT4, as described just above. As already noted, each satellite can "see" about 5,000 miles over the horizon to other satellites potentially available for incorporation into a radio route between any two ground stations.

Figure 4:
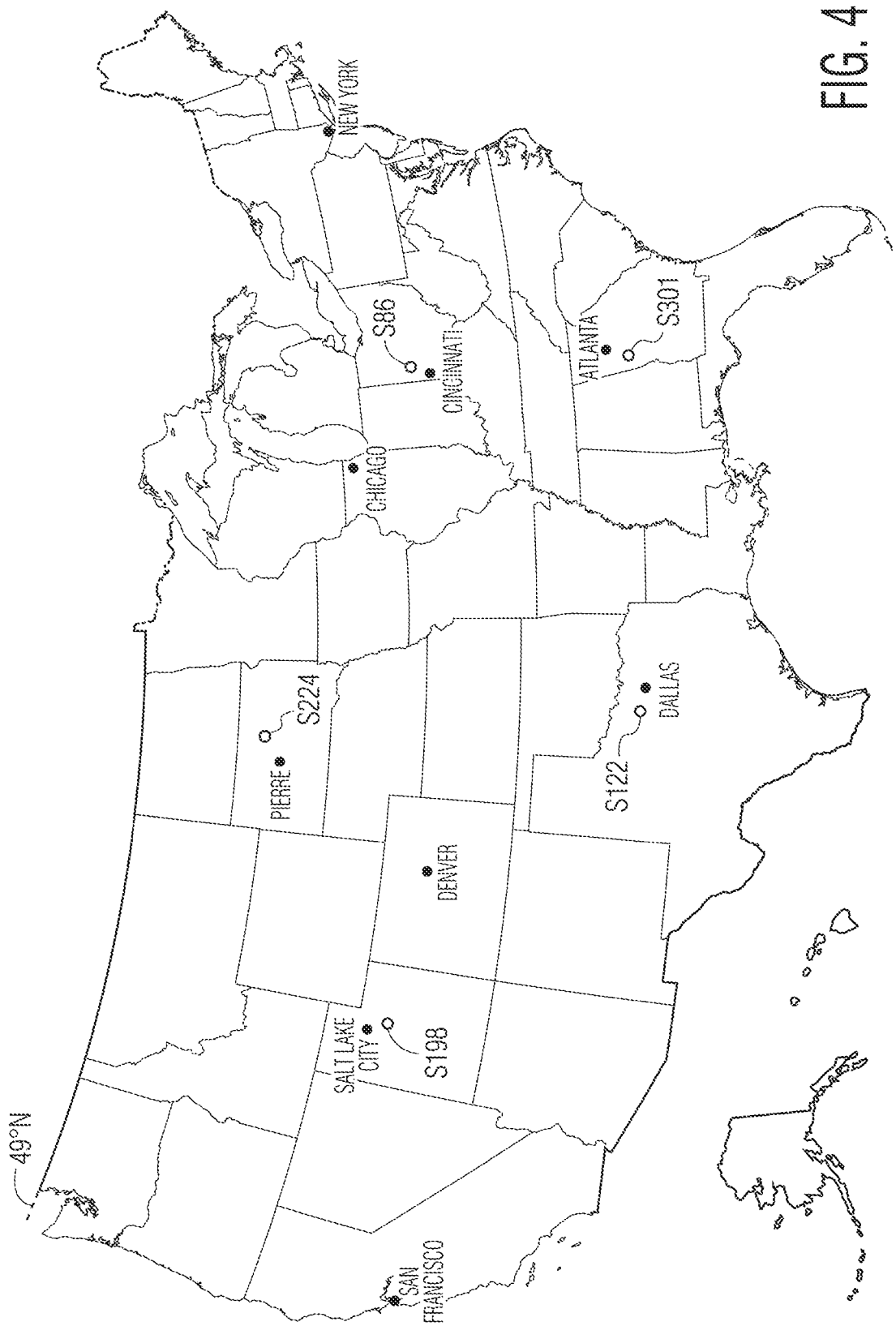
FIG. 4 is a map of the continental United States used to illustrate several important features of the systems and methods of route creation and data transmission described herein.

FIG. 4 illustrates that almost the entire continental United States, the northern border of which with Canada is at 49° N, will be within the area of the earth's surface serviceable by a constellation of satellites in OT4 orbital paths at an altitude of 800 miles. (Hawaii and most of Alaska will also be able to see satellites.) The band management system comprising the present aspect of the system will be described with reference to establishing radio links for routes between San Francisco, CA; Denver, CO; Chicago, IL; and New York City, NY.

Figure 5:
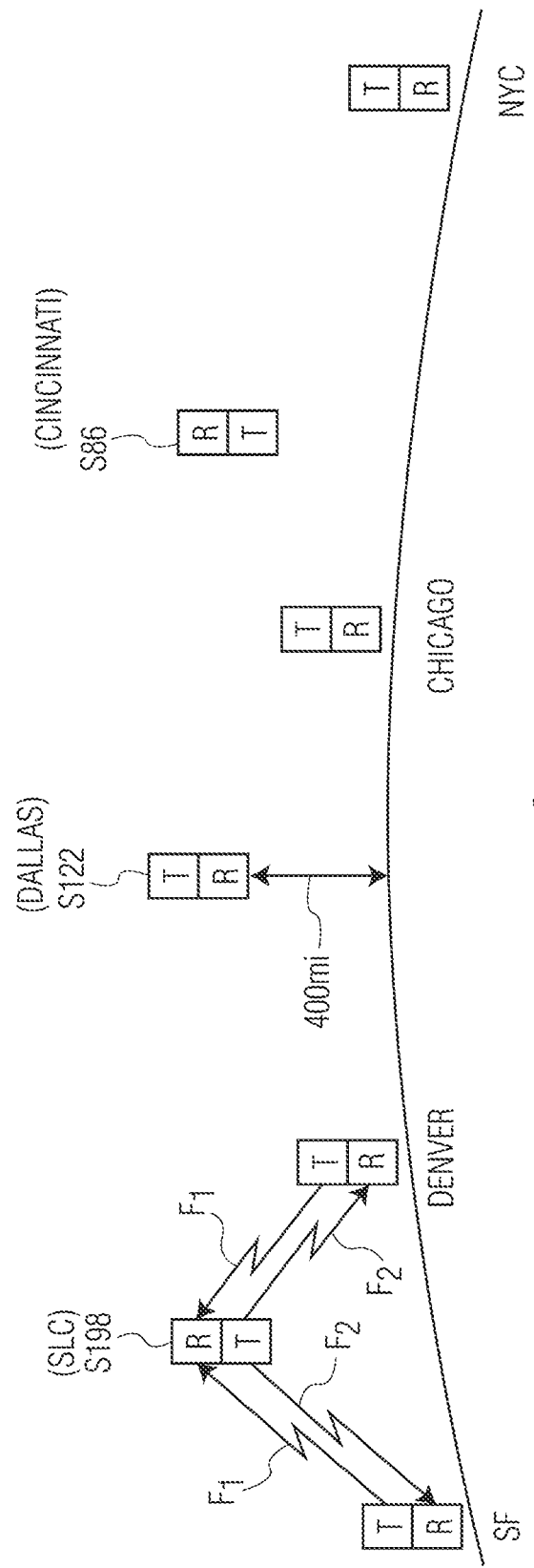
FIG. 5 depicts a ground/satellite/ground two-hop "bent pipe" radio route effected as described in the assignee's referenced U.S. Pat. No. 10,084,536, wherein the ground stations can communicate with each other via a single satellite.

FIG. 5 illustrates systems such as those disclosed in the assignee's U.S. Pat. No. 10,447,381 mentioned above. The satellites are denoted by an alpha-prefix "S" and a number signifying it as a particular one of the 200 satellites in the constellation. Certain satellites comprise antennas R/T that can simultaneously receive radio signals only in a first frequency band $F_1$ and transmit radio signals only in a second frequency band $F_2$. That is, they cannot transmit signals in the frequency band $F_1$ or receive signals in the frequency band $F_2$. These satellites are denoted by the upper "R" and lower "T" in FIG. 5 and will be referred to herein as Type RT nodes. The ground stations, at San Francisco, Denver, Chicago, and New York City, comprise antennas T/R that can simultaneously transmit radio signals only in the first frequency band $F_1$ and receive radio signals only in the second frequency band $F_2$, and cannot receive signals in the frequency band $F_1$ or transmit signals in the frequency band $F_2$. The ground stations are all Type TR nodes as indicated by the upper "T" and lower "R" in FIG. 5. In accordance with U.S. Pat. No. 10,447,381, the constellation can contain a certain number of Type RT satellites (referred to as Type A in the patent), while all of the ground stations are Type TR (Type B in the patent). In FIG. 5, the satellites S198 and S86 are Type RT nodes and the satellite S122 is a Type TR node (the role of the satellite S122 is discussed below in connection with FIG. 8). At the time depicted in FIGS. 5 and 6, the satellite S198 is in the vicinity of Salt Lake City, UT; the satellite S122 is in the vicinity of Dallas, TX; and the satellite S86 is in the vicinity of Cincinnati, OH. This depiction represents a conservative estimate of the number of satellites visible to the continental U.S., since per the above discussion several satellites on average will be visible to any point in the continental U.S., and each of those satellites will be within line of sight of any other satellite in the constellation up to a distance of 5,000 miles. (The satellites S224 and S301 are discussed below in connection with FIG. 8.)

FIG. 5 illustrates a "bent pipe" route between the San Francisco and Denver ground stations via the satellite S198. A bent pipe route is also possible between San Francisco and Chicago, which is 1,300 miles from Salt Lake City (satellite S198). However, a bent pipe route between San Francisco and New York City via the satellite S198 is less reliable, since Salt Lake City is 2,000 miles from New York City. Likewise, a bent pipe route between San Francisco and New York City via the satellite S86 in the vicinity of Cincinnati is less reliable since Cincinnati is 2,000 miles from San Francisco. And although San Francisco and New York City are both within the range of the satellite S122 over Dallas (SF↔Dallas≈1,450 mi. and Dallas↔NYC≈1,350 mi.), the satellite S122 is a Type TR node and cannot communicate with the ground stations. While the probabilities suggest that there will be satellites available for bent pipe routes between most ground stations, the number that will provide robust radio routes may be limited in the system depicted in FIG. 6.

Figure 6:
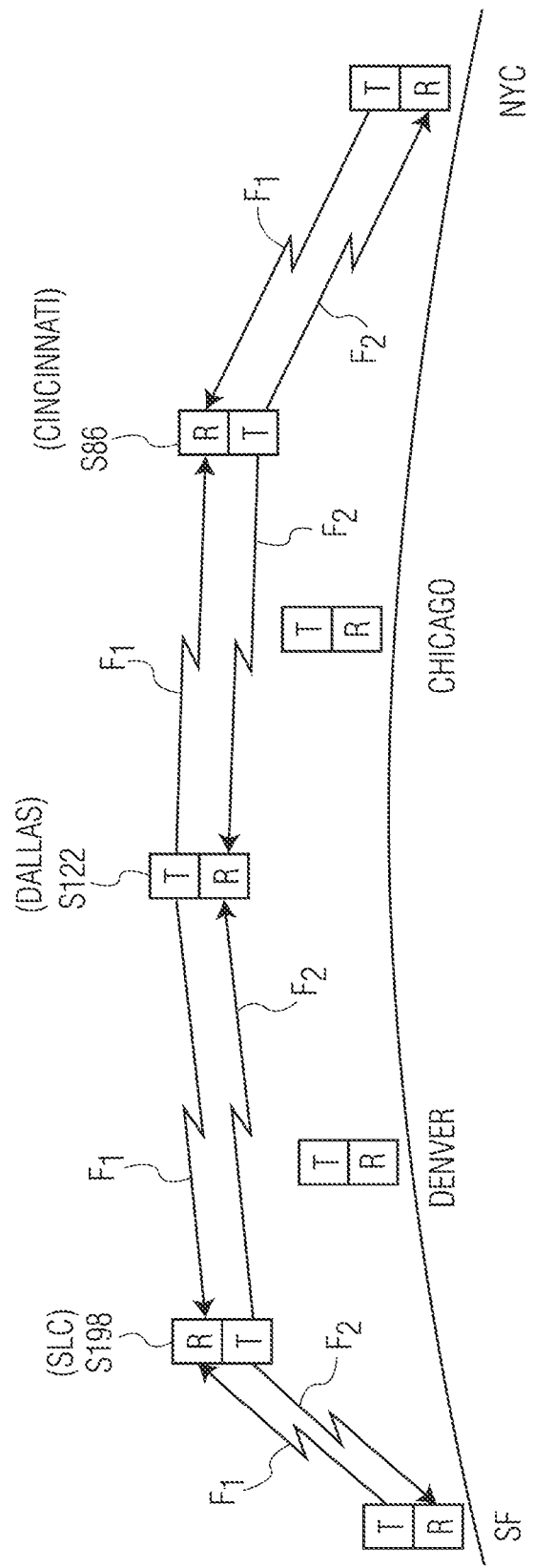
FIG. 6 depicts an exemplary ground/multiple-satellite/ground radio route incorporating more than three hops in a radio route created by incorporating in the satellite constellation a certain number of "blind" satellites that can communicate with other satellites but not with ground stations, also as described in the assignee's U.S. Pat. No. 10,084,536.

FIG. 6 illustrates a route between San Francisco and New York City, which relies on the Type TR satellite S122 near Dallas as an intermediate node to link the Type RT satellites S198 and S86. However, with the depicted distribution of satellites this route includes four links ("hops"), including the hops between the San Francisco and New York ground stations and the respective satellites with which they are linked. Generally speaking, it is better to have as few hops as possible since all of the links in a route may not last the same length of time, which can shorten the amount of time available for sending a particular transmission from one ground station to another. By the same token, although a bent pipe (two-hop) route between Chicago and San Francisco is possible via the satellite S198 over Salt Lake City, the length of the link between Salt Lake City and Chicago (approx. 1,300 mi.) may affect the strength of the radio signal and introduce errors into transmissions between those ground nodes. In addition, a four-hop route (not shown) may be available between Chicago and San Francisco via the satellites S198 and S86, but it would suffer from the same potential issues as the four-hop route between San Francisco and New York City. It will be appreciated that only bent pipe routes and routes with an even number of satellite-to-satellite links can be created with the system depicted in FIGS. 5 and 6. That is, this system will not support a radio route that only includes one satellite-to-satellite link, so that if only low quality bent pipe routes are available between two ground stations, the next best alternative is a four-hop route that includes two satellite-to-satellite links.

Figure 7:
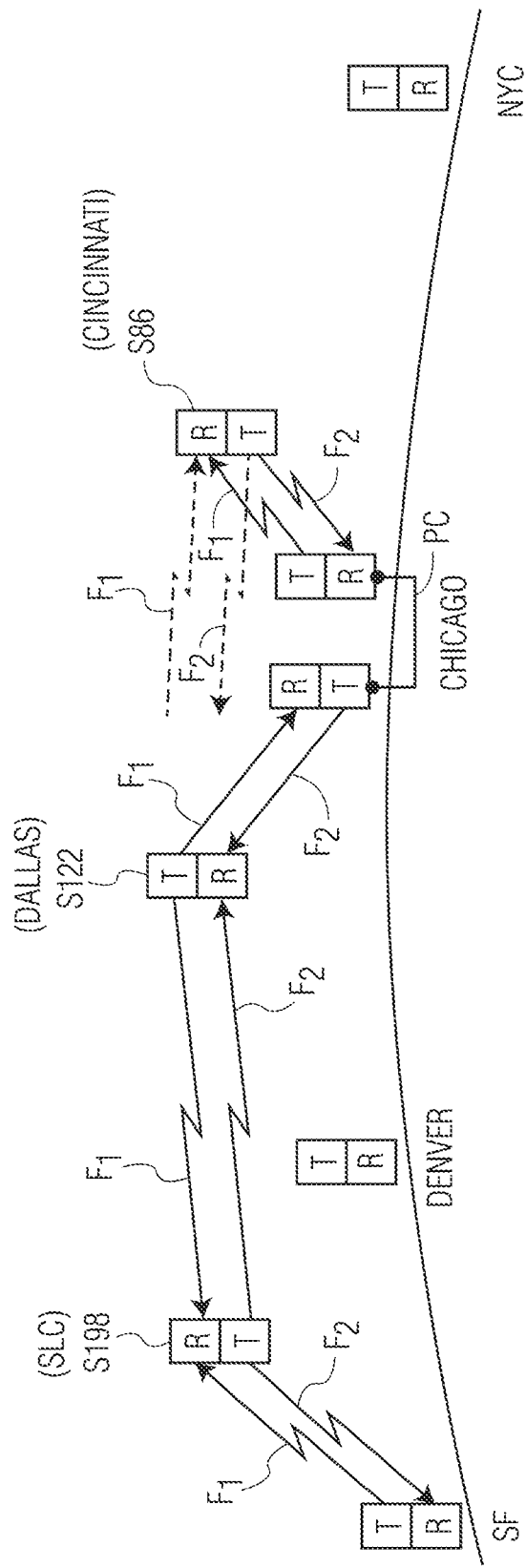
FIG. 7 depicts a communication system with a constellation of satellites of a first type and a second type, wherein satellites of one type can only communicate with satellites of the other type, and with selected ground stations that can communicate with both types of satellite.

The system depicted in FIG. 7 enables the creation of routes comprising odd numbers of satellite-to-satellite links, and thus increases the probability of creating a high quality route between any two ground stations, while still maintaining the ability of the system to support duplex operation by transmitting and receiving radio signals simultaneously. This system incorporates a certain number of dual-type ground nodes, comprising twin nodes with two sets of antennas, one of which is a Type RT antenna set and the other of which is a Type TR antenna set. That is, the Type RT antenna set can simultaneously receive radio signals only in a first frequency band $F_1$ and transmit radio signals only in a second frequency band $F_2$, and cannot transmit signals in the frequency band $F_1$ or receive signals in the frequency band $F_2$. Likewise, the Type TR antenna set can simultaneously transmit radio signals only in the first frequency band $F_1$ and receive radio signals only in the second frequency band $F_2$, and cannot receive signals in the frequency band $F_1$ or transmit signals in the frequency band $F_2$. FIG. 7 illustrates how such a system would operate using a dual-node ground station at Chicago. FIG. 7 depicts a three-hop route, with a single satellite-to-satellite link, between the Chicago RT node and San Francisco (TR) via the satellite S198 (RT) and the satellite S122 (TR). However, as noted above, a two-hop bent-pipe route (not shown) from San Francisco (TR) to the Chicago TR node is also potentially available via the satellite S198 (RT).

In a system such as that depicted in FIG. 7 adapted for duplex operation, routing messages sent and received in different frequency bands may be received on a different one of the Type RT and Type TR antenna sets. In a preferred embodiment, the antenna sets are connected to processing circuitry PC represented schematically in the drawing. The processing circuitry determines which one of the antenna sets will provide the preferred route back to the ground station that sent the initial information signal. In the present example the Chicago ground station will be able to choose the preferred route to San Francisco by analyzing the properties of the respective routing messages received by the Chicago Type TR antenna set directly from the satellite S198 or the Chicago Type RT antenna set via the satellites S198 and S122, and selecting the best route for data transmissions back to San Francisco. Typically, the satellite constellation will include equal numbers of Type RT and Type TR satellites to maintain the statistical probabilities underlying link creation between the system nodes. The present example is based on 100 of each type of satellite, but the scalability of the system allows for more satellites to increase the probability that high quality routes will be available between any two ground stations.

The system shown in FIG. 7 is also capable of supporting a four-hop route between San Francisco and the Chicago Type TR antenna set via the satellites S198, S122, and S86 (which can also be seen from FIG. 6). In such a situation, where one or both of the nodes in a dual-type ground node receives multiple routing messages from different satellites, the resident processing circuitry selects the antenna set (and the particular antenna therein) for a preferred radio route to the sending ground station. For example, if the Chicago Type TR antenna set node receives a routing message from the satellite S198 (as discussed above) on one antenna and a routing message from the satellite S86 on a different antenna, and the Chicago Type RT antenna set receives a routing message from the satellite S122, the processing circuitry selects from the three antennas the one that provides a preferred radio route back to San Francisco in accordance with the route creation protocol described earlier.

The particular dual-type ground nodes as in FIG. 7 are typically placed in densely populated areas or other applications where high traffic and heavy demand are present, such as large urban areas. Several of the dual-type ground nodes can be placed in those areas. New York City would be a likely candidate for the inclusion of dual node ground stations, also. It may be necessary to increase the number of satellites of both types in the constellation to take full advantage of the additional routing opportunities presented by the ability to establish more radio links with a particular ground station location incorporating the dual-type node configuration.

Figure 8:
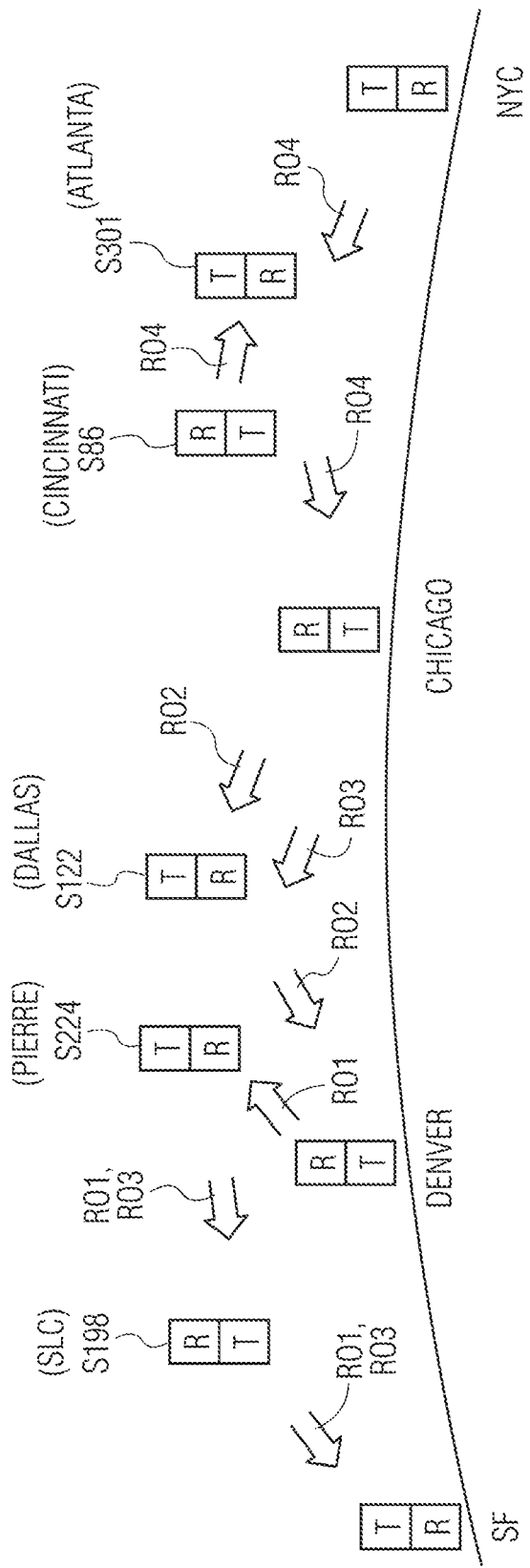
FIG. 8 depicts a communication system comprising a constellation of satellites of a first type of satellite and a constellation of satellites of a second type, and ground stations of the first type and the second type, wherein satellites of the first type and second type can only communicate with satellites and ground stations of the second type and first type, respectively.

FIG. 8 illustrates another variation of the present system that enables the creation of radio routes with even and odd numbers of radio links between ground stations. In this system the ground stations are constructed either as Type TR nodes that transmit and receive in frequency bands $F_1$ and $F_2$, or Type RT nodes that receive and transmit in frequency bands $F_1$ and $F_2$. These ground stations are distributed more or less randomly with a given region of the system service area including a plurality of each type with different types interspersed with each other to the greatest extent possible. However, the distribution of the ground stations is not critical in view of the statistical nature of the route creation process. In FIG. 8 the San Francisco and New York ground stations are Type TR nodes and the Denver and Chicago ground stations are Type RT nodes.

FIG. 8 is similar to FIGS. 5-7 in that it represents a constellation of 200 satellites comprising 100 each of Type TR satellites and Type RT satellites as exemplified by the satellite S198 (RT) in the vicinity of Salt Lake City, the satellite S122 (TR) in the vicinity of Dallas, and the satellite S86 (RT) in the vicinity of Cincinnati. However, it will be apparent from FIG. 9 that bent pipe routes cannot be created between different type ground stations. Accordingly, to maintain the same probability of route creation between any two ground stations, the present embodiment adds 200 more satellites, represented by a Type TR satellite S224 in the vicinity of Pierre, SD, and a Type TR satellite S301 in the vicinity of Atlanta, GA. The additional 200 satellites will typically comprise 100 of each type node.

The following table lists examples of potential radio routes with the satellites in the positions depicted in FIG. 8:
Denver→S224→S198→San Francisco (Route RO1)
Chicago→S122→Denver (Bent pipe) (Route RO2)
Chicago→S224→Denver (Bent pipe) (not shown)
Chicago→S224→S198→San Francisco (Route RO3)
New York City→S86→S301→Chicago (Route RO4)

A system like that depicted in FIG. 8 will increase the probability of being able to assemble an overall high quality route because of the probability that the nodes in the system will have higher quality radio links to choose from as the route is being created from node to node. For example, the link between the satellites S198 and S224 and between the satellite S198 and the San Francisco ground station supports both route RO1 and route RO3. This is possible because the routing messages from the satellites S224 and S198 are sent in different time slots for each route, per the discussion in the following section. Data transmitted from San Francisco and addressed to Denver will automatically travel via route RO1 and data addressed to Chicago will automatically travel via route RO3 by virtue of the respective satellite antennas on which the routing messages were received (because of antenna reciprocity). That is, data addressed to Denver and data addressed to Chicago will be transmitted from San Francisco using the antenna on which the routing messages from the satellite S198 were received and from the satellite S198 using the antenna on which the routing messages were received from the satellite S224. Data addressed to Denver will be transmitted from the antenna of the satellite S224 associated with the route RO1 routing message from Denver, and data addressed to Chicago will be transmitted from the antenna of the satellite S224 associated with the route RO3 routing message received from Chicago. Another advantage of using a combination of type RT and type TR ground stations is that compared to having only one type of ground station (see FIGS. 5 and 6), it increases the probability that routes can be created between two given ground stations while also increasing the bandwidth available for route creation by making it possible to use the same bandwidth twice to create routes.

The dual frequency band route creation protocol described herein should also be considered in connection with the developing field of software-defined radios (SDR). This type of radio communication system replaces components that have been traditionally implemented in hardware (such as mixers, filters, amplifiers, modulators/demodulators, detectors, etc.) with software on a personal computing device. As SDR technology emerges, it will become more useful at higher and higher carrier frequencies, and will permit computing devices to transmit very short bursts of energy separated by a precise amount of time. This could automatically create a carrier frequency and its associated information that is typically modulated onto the carrier. The result is that a given SDR could transmit simultaneously different communications on different carrier frequencies. A personal handheld device such as a smartphone, configured as an SDR, would be able to operate as a T/R or R/T node in the frequency band communication system described above.

C. Route Creation in Systems with up to 100 Ground Stations

To be practicable, any space-based system that creates routes between ground stations via a constellation of satellites must be able to support myriad data communications between multiple pairs of ground stations at the same time. The preceding section describes satellite and ground station embodiments that support simultaneous two-way (duplex) exchanges of radio signals between two satellites and between satellites and ground stations. In addition it is important that routes for multiple communications be created as quickly as possible. For example, enabling data communications among any two of 100 ground stations requires the system to be able theoretically to create 10,000 routes at the same time. Although the exemplary embodiment described herein is applied in a constellation of stochastically distributed satellites, it is generally applicable to any space-based communication system, as noted above. The system supports the rapid creation of large numbers of routes because it can be implemented using routing messages of limited size, typically 8-10 bytes.

As also discussed above, one feature of the assignee's systems is route creation via one or more satellites in one direction (from a sending ground station to a receiving ground station), and then transmitting data from an originating ground station (the receiving ground station) to a destination ground station (the sending ground station) designated by address information in the data. Although the positions of stochastically distributed satellites in uncontrolled orbits constantly change relative to each other and to the ground stations, the embodiment described in this section assumes that a radio link created between two satellites has a useful life of at least four seconds. A principal feature of the route creation/data transmission method described here is separating the useful life of a route into segments for route creation and data transmission, respectively. "Useful life" refers to the length of time that the radio links-ground/satellite and satellite/satellite (if any)—remain sufficiently stable to permit the nodes to exchange radio signals. In this example, the first second is used for route creation by transmitting routing messages in one direction, and the remaining time, three seconds in this example, is used for transmitting the data in the reverse direction via the nodes of the just-created route.

Further details of the route creation method are described in the '136 patent at column 17, line 45, to column 22, line 9 (with particular reference to FIG. 6), and in the description further below. Every ground station creates a local area routing network, which resembles a tree with many branches spanning out from a sending ground station. The "branches" (potential links in a radio route) the "tree" are added one at a time, with the decision to add a branch to the tree being made by each satellite based on criteria described in the '136 patent. This type of local area network is sometimes referred to herein as a "spanning tree" or "virtual spanning tree." Thus, in a system with 100 terrestrial nodes (ground stations), 100 such trees are created; all 100 ground stations receive routing messages from one or more satellites; and accordingly, there are 10,000 potential routes. When a route has been created, each node sending a data communication only knows the particular antenna from which to transmit the data. That is, the present system avoids identifying the nodes making up all of the routing trees and storing them in a system node or in a separate controlling computer. Instead, routes are rapidly created by the recursive logic described below to provide a large number of routes in a very short time, because the method does not attempt to identify the nodes that comprise all of the potential routes in a system (for example, 10,000 in a system with 100 ground stations).

As noted, the route creation process in the present embodiment occupies the first second of the four-second operational cycle. During the first second the route creation circuitry in each satellite performs the route creation process in assigned time slots. System timing is provided by the master clock of a global navigation satellite system. The satellites communicate with the GNSS system via the GNSS module 44 in each satellite (FIG. 2). The ground stations include similar circuitry, so that all of the system nodes (satellites and ground stations) operate on the same master clock.

Figure 9A:
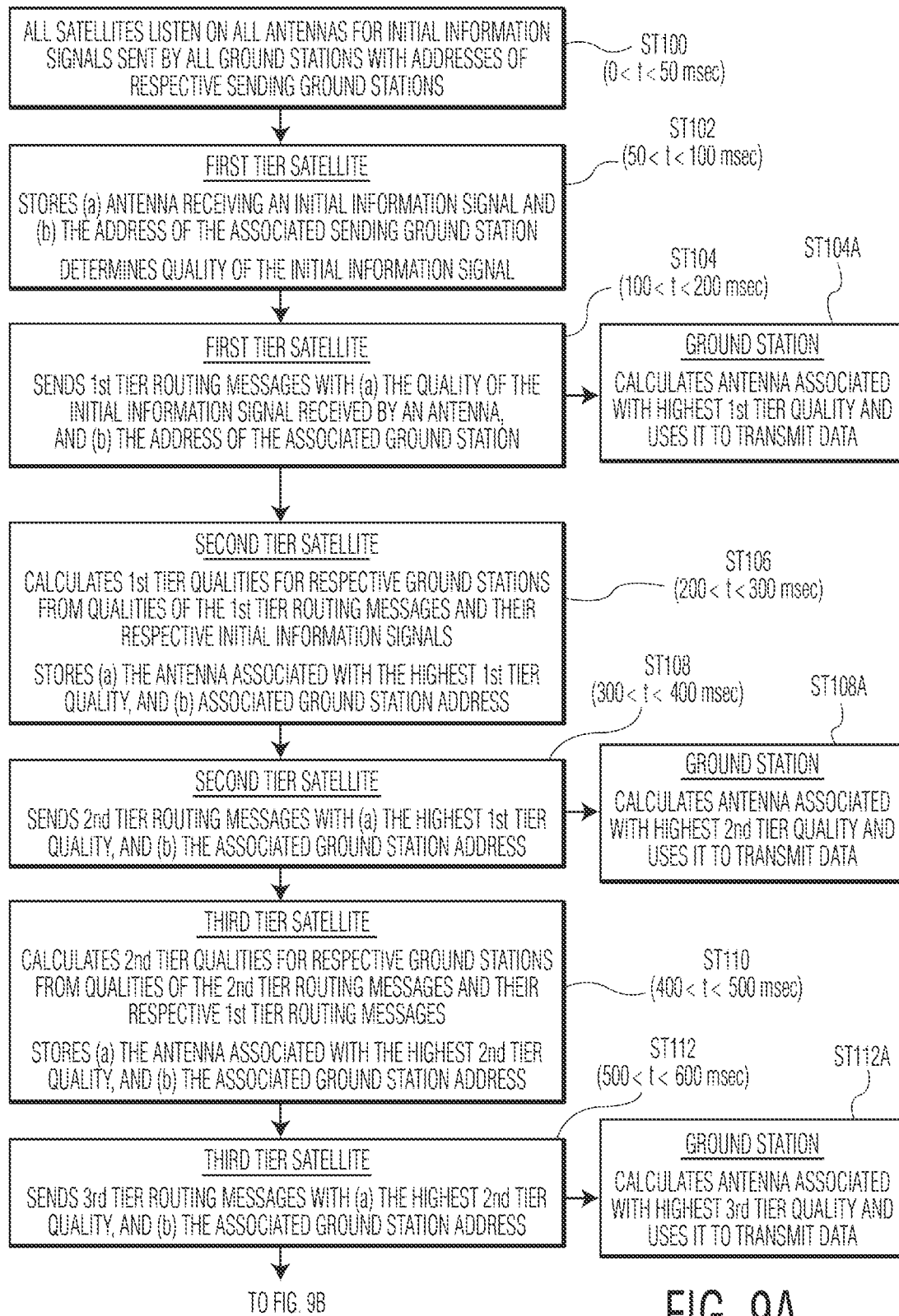
FIGS. 9A and 9B, is a flowchart illustrating a route creation method employed by a communication system described in connection with FIGS. 7 and 8.
Figure 9B:
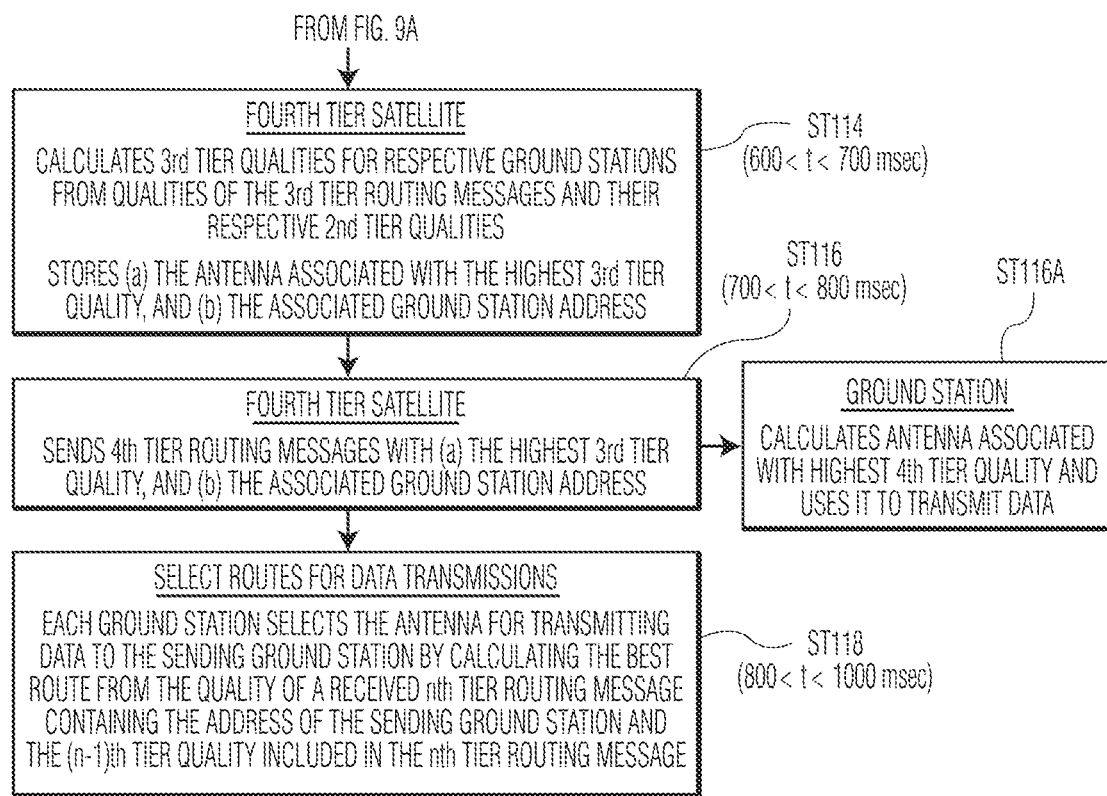

According to this embodiment, the route creation module 46 in each satellite performs the steps shown in FIGS. 9A and 9B in the following time slots:

Step ST100—Start-Up Phase 1 (0<t<50 msec.)

Respective satellite antennas receive initial information signals transmitted by all of the ground stations in the system. As noted, a satellite antenna will typically receive only one initial information signal. By the same token, a particular satellite may not receive any initial information signals. The initial information signals include address information uniquely identifying the sending ground station. In one implementation the initial information signal includes a three-digit ground station identifier and a three-digit checksum for error correction. Satellites receiving initial information signals are referred to as "first tier satellites." The initial information signals will typically be transmitted simultaneously from all of the ground stations in the system, but because the satellites within range of a ground station may be hundreds, or even thousands, of miles away depending on the satellite altitude, this phase is designed to ensure that it lasts long enough for all of the satellites to receive initial information signals from all ground stations within sight. Although in any given iteration it may take less time, data transmissions throughout the system will be more reliable if all of the satellites have received the maximum number of initial information signals from the maximum number of ground stations during this phase of route creation.

Step ST102—Start-Up Phase 2 (50<t<100 msec.)

The route creation circuitry in each first tier satellite stores the identity of the antenna on which each initial information signal was received and associates it with the address information of the sending ground station. A quality of the received initial information signal, which is an indication of the suitability of the satellite as a node in a route, is determined and stored in the satellite. In a typical implementation this is the strength of the signal, but it can also be other parameters or determined in other ways, such as detecting an error rate in the signal. In one embodiment the identity of antennas that receive initial information signals below a certain quality are not stored. The route creation circuitry includes a suitable algorithm for performing a conventional integrity check for errors in the received three-digit ground station address information using the checksum included in the signal. If an initial information signal is received on more than one antenna, the route creation circuitry only stores the one with the best quality.

Step ST104—First Transmit and Receive (100<t<200 msec.)

The first tier satellites send first tier routing messages from all of its antennas either in the first frequency band $F_1$ if it is a Type TR node, or in the second frequency band $F_2$ if it is a Type RT node. At the same time—that is, while the satellite is transmitting—it can also receive first tier routing messages from satellites of the opposite type. Likewise, ground stations of the opposite type of the satellite can receive the first tier routing messages. Each first tier routing message includes the address of the sending ground station and the quality of the initial information signal. This information can also include a checksum to the same purpose as described in connection with the initial information signal. The duration of this step is designed to be of sufficient duration to permit all of the first tier routing messages to reach their destinations (up to 5,000 miles away in the case of other satellites) and be checked for accuracy before initiating the following step. Although the signals travel at the speed of light, it will still require a finite time for signals to reach far distant satellites. This "quiet time" is also built into the further transmit and receive steps described below.

Step ST106—Process First Tier Routing Messages (200<t<300 msec.)

Every satellite that receives a first tier routing message, referred to here as a "second tier satellite," stores the identities of the antennas on which the respective first tier routing messages were received and associates each with the sending ground station address included in the first tier routing message. The satellite determines the quality of the received first tier routing message. (In this and subsequent processing steps, only the highest quality routing message for each ground station received on a given antenna is associated with that antenna.) The satellite uses an onboard algorithm in its route creation circuitry to convert the combined qualities of the received first tier routing messages and the initial information signal included in the first tier routing message into a first tier quality representing the suitability of the transmitting and receiving satellites as nodes in a radio route back to the ground station that transmitted the initial information signal. The first tier quality is a composite of the quality of the received routing message and the quality of the initial information signal included in the received routing message. It can be calculated in various ways, such as by assigning a rank based on adding the qualities of the initial information signal and each first tier routing message after eliminating first tier routing messages below a certain quality. (The disclosure in the '136 patent, for example, at column 19, line 28, to column 20, line 67, of various algorithms for calculating composite qualities based on the quality of a received signal and a quality included in the received signal is incorporated herein by reference.) Only the highest ranking first tier quality is retained (for inclusion in the second tier routing messages discussed in the next step), along with the identity of the antenna receiving the first tier routing message associated with the highest rank first tier quality. A ground station that receives a first tier routing message stores the identity of the antenna on which it was received, the quality of the received first tier routing message, and the address of the sending ground station. Software at the ground station calculates the first tier quality in a fashion similar to that used by a second tier satellite.

Step ST108—Second Transmit And Receive (300<t<400 msec.)

Each second tier satellite sends second tier routing messages from all of its antennas either in the first frequency band $F_1$ if it is a Type TR node or in the second frequency band $F_2$ if it is a Type RT node. As noted above, satellites transmitting second tier routing messages can at the same time receive second tier routing messages from first tier satellites of the opposite type. Likewise, ground stations of the opposite type of the second tier satellites can receive the second tier routing messages. Each second tier routing message includes the address of the sending ground station and the composite first tier quality. This information can also include a checksum to the same purpose as the described above. A node (satellite or ground station) that receives a second tier routing message stores the identity of the antenna on which it was received, the quality of the received second tier routing message, and the address of the sending ground station. The second and subsequent transmit and receive steps are, like the first (step ST104), designed to be of sufficient duration to permit all of the respective tier routing messages to reach their destinations before initiating the next processing step.

Step ST110—Process Second Tier Routing Messages (400<t<500 msec.)

Every satellite that receives a second tier routing message, referred to here as a "third tier satellite," associates the identity of the antenna on which the second tier routing message was received with the ground station address included in the routing message, and stores the first tier quality included in the second tier routing message. The third tier satellite determines the quality of the received second tier routing message and converts the combined qualities of the received second tier routing message and the first tier quality included in the routing message into a second tier quality with a rank representing the suitability of the first, second and third tier satellites as nodes in a radio route back to the ground station that sent the initial information signal. The second tier quality can be calculated from the first tier quality and the quality of the received second tier routing message similarly to the manner in which the first tier quality is calculated. As before, only the highest ranking second tier quality for a given satellite antenna is retained for inclusion in the third tier routing messages, along with the identity of the antenna receiving that second tier routing message. A ground station that receives a second tier routing message associates the antenna on which it was received with the ground station address included in the second tier routing message. It also determines the quality of the second tier routing message and calculates a second tier quality in a fashion similar to that used by a third tier satellite.

Step ST112—Third Transmit and Receive (500<t<600 msec.)

Each third tier satellite sends third tier routing messages from all of its antennas either in the first frequency band $F_1$ if it is a Type TR node or in the second frequency band $F_2$ if it is a Type RT node. (It can also receive third tier routing messages from second tier satellites of the opposite type.) Likewise, ground stations of the opposite type of the third tier satellites can receive the third tier routing messages. Each third tier routing message includes the address of the sending ground station and the second tier quality included in the routing message. This information can also include a checksum to the same purpose as the described above. A node (satellite or ground station) that receives a third tier routing message stores the identity of the antenna on which it was received, the quality of the received third tier routing message, and the address of the sending ground station.

Step ST114—Process Third Tier Routing Messages (600<t<700 msec.)

Every satellite that receives a third tier routing message, referred to here as a "fourth tier satellite," associates the identity of the antenna on which the third tier routing message was received with the ground station address included in the routing message, and stores the second tier quality included in the third tier routing message. The fourth tier satellite determines the quality of the received third tier routing message and converts the combined qualities of the received third tier routing message and the second tier quality included in the routing message into a third tier quality with a rank representing the suitability of the first to fourth tier satellites as nodes in a radio route back to the ground station that transmitted the initial information signal. The third tier quality can be calculated from the second tier quality and the quality of the received third tier routing message similarly to the manner in which the first tier quality is calculated. Like previous processing steps, only the highest ranking third tier quality for a given satellite antenna is retained for inclusion in the fourth tier routing messages, along with the identity of the antenna receiving that third routing message. A ground station that receives a third tier routing message associates the antenna on which it was received with the ground station address included in the third tier routing message.

Step ST116—Fourth Transmit and Receive (700<t<800 msec.)

In an optional implementation, each fourth tier satellite sends fourth tier routing messages from all of its antennas in the same fashion as in the previous transmit and receive steps. Each fourth tier routing message includes the address of the sending ground station and the third tier quality included in the routing message. A node (satellite or ground station) that receives a fourth tier routing message stores the identity of the antenna on which it was received, the quality of the received fourth tier routing message, and the address of the sending ground station.

Step ST118—Select Routes to Ground Stations (800<t<1000 msec.)

Although the route creation process can theoretically continue to add satellite nodes, the present embodiment terminates the process at 800 msec. In most instances this will produce a sufficient number of possible routes to support robust communications between pairs of all of the ground stations. The computing time required to support route creation is managed by calculating potential routes to a particular sending ground station as the routing messages associated with that ground station are received and stored. If an $(n+1)^{th}$ routing message provides a higher quality route to a particular ground station than an $n^{th}$ routing message, the $n^{th}$ routing message is deleted from the ground station memory. This approach, combined with the recursive logic used to calculate the highest quality route associated with each tier of satellites, results in rapid automatic identification of optimum routes between a large number of ground stations.

It will be appreciated that the method just described could include one or more additional pairs of recursive steps following the steps ST114 and ST116. For example, a different number of steps might be advantageous depending on satellite altitude or whether or not the satellites include attitude control, as well as other system design parameters. For example, satellite altitude can affect the number of steps employed since they will be visible to each other over longer distances. It will also be appreciated that the optimum number of steps required will be affected by the fact that any given route only has to connect over one-half of the earth's circumference.

The above description explains how 10,000 routes can be created in less than a second, thus providing a practicable system comprising 100 individual terrestrial nodes. However, this is meant as only one example of such a system that can also be applied to systems with many more terrestrial nodes. The capacity of any such system can be increased by dividing the earth's surface into 100 or more zones, and combining a zone routing system with the above individual terrestrial node system. This will support a larger number of ground stations, and the corresponding increase in the number of users on the system at one time. Such a zone system would be implemented by each satellite first determining if an individual node tree is available, and if not, reverting to the zone system for the next link, as described in connection with FIG. 7 of the '136 patent.

In an alternate implementation, any ground station that receives a routing message during a transmit-and-receive step can immediately use that ground station to transmit data on the antenna associated with the received routing message. This is illustrated in the steps with an "A" suffix in FIG. 9A. In step ST104A, a ground station that receives a first tier routing message including the address of a destination ground station for which it has a data transmission can immediately send it to that ground station via the best bent pipe route available. The "best route" transmits the data from the ground station antenna associated with the highest first tier quality, which the ground station calculates in the same fashion as a second tier satellite, described above in connection with step ST106. For example, if one or more Chicago to Denver bent pipe routes are established via first tier routing messages, any data transmissions addressed to Denver can be immediately sent from Chicago via the best available route without waiting until step ST118 to see if other routes become available in subsequent time slots. The same approach can be used for a two-satellite route when a ground station receives one or more second tier routing messages. This is depicted by alternate step ST108A, in which such ground stations can immediately transmit data to a destination ground station from its antenna associated with the highest second tier quality, calculated as described in connection with step ST110. Alternate step ST112A depicts the case in which a ground station receives one or more third tier routing messages. It can then immediately transmit data via the best available three-satellite route determined in the same fashion as described above for a two-satellite route, but using the received third tier routing messages to calculate the best route as described above in connection with step ST114. Step 116A illustrates the same principle in the case where a ground station receives one or more $4^{th}$ tier routing messages. This alternate embodiment may be preferable in certain environments in which it can speed overall data transmission and require less composting power at each satellite and ground station.

In a preferred implementation any originating ground station in the system can be holding data addressed to one or more sending ground station destinations. In the embodiments discussed above the ground stations either wait until step ST118 to select the best route for each transmission, or transmit data as routes become available, as in steps ST104A, ST108A, and ST112A. Data transmissions preferably will include the address of its originating ground station, and the destination ground station can return an acknowledgement signal confirming that the destination received the data. Since the system automatically creates routes among the various ground stations, there should in most cases be a route back to the originating ground station during the same three second data transmission segment of the four second operational cycle discussed above. However, a destination ground station can hold a receipt signal for the originating station until a route becomes available in subsequent operational cycles.

Although the method described above separates route creation from data transmission in time, other approaches could separate these functions by frequencies and/or carry out both functions simultaneously. Separating these functions into time slots as described in connection with FIG. 9 simplifies the explanation of the underlying complex logic behind route creation according to the principles described herein. In another variation, routes can be created between two distant ground stations via a first intermediate route, comprising one or more aerial nodes, from an originating ground station to an intermediate ground station and a second intermediate route, comprising one or more aerial nodes (which could include aerial nodes in the first intermediate route), from the intermediate ground station to a destination ground station.

The aforementioned method, in which each intermediate satellite selects the optimum subroute back to the sending ground station and erases all other potential subroutes, leads to at least three significant results:

When the method is complete, the resulting route is guaranteed to be mathematically the most optimum possible route. In actual radio systems where signal to noise, adjacent channel splatter, and receiver intermodulation can occur, the elimination of such effects greatly increase the integrity of the routes created by methods such as those discussed herein.

Since each tier of satellites only sends routing messages that provide the optimum subroute back to the sending ground station, and since the only other information in a routing message is the address of the ground station associated with it, the maximum number of routing messages that will be sent by any satellite is inherently limited to the number of sending ground stations.

All of the routing messages sent on a satellite antenna at any particular time will preferably be combined into one string, a single checksum or other error detection data in the string can suffice for detection of possible errors in the routing messages, thus providing an efficient use of the capacity of the satellites' onboard computers.

The result is that the amount of data actually transmitted between satellites to create routes throughout a large number of ground stations is very small.

Figure 10:
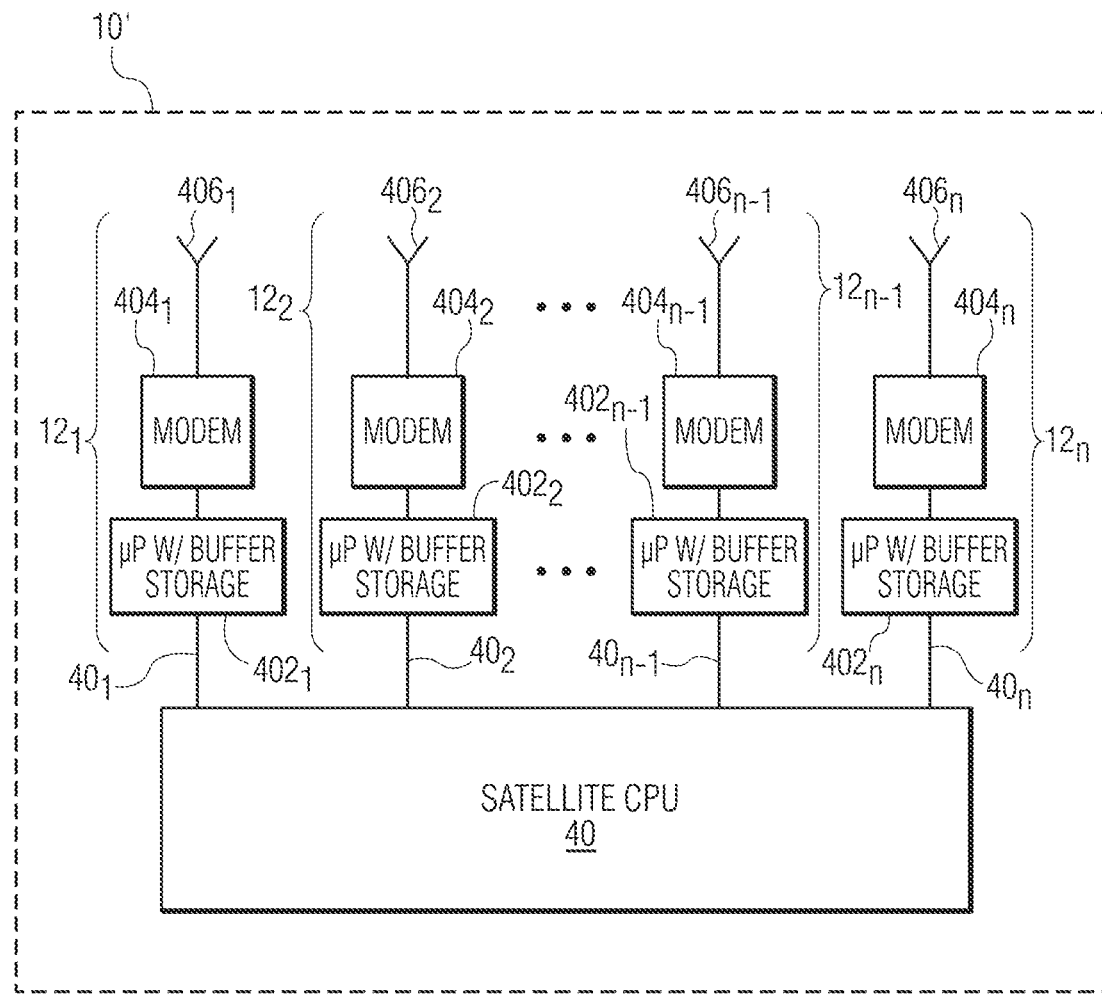
FIG. 10 illustrates schematically circuitry resident in a satellite for effecting route creation and data transmission according to the description herein.

FIG. 10 is a schematic diagram of the circuitry in a satellite 10' comprising a modified version of the satellite 10 that is specially adapted to perform the method depicted in the FIG. 9 flowchart. The satellite 10' has multiple antenna modules $12_1, 12_2, \ldots, 12_{n-1}, 12_n$ corresponding to the antenna modules 12 in the satellite 10 discussed above in connection with FIG. 2. The methods of route creation and data transmission described herein for a system with hundreds of ground stations and satellites require processing, transmission, and receipt of large amounts of information. The modified satellite 10' facilitates the flow of data and routing messages by incorporating in each antenna module 12 a dedicated microprocessor with buffer storage 402 and a dedicated modem 404 (modulator/demodulator), which combine to manage the flow of information between the satellite's CPU 40 and the antenna 406 of the particular antenna module. Specifically as shown in FIG. 10, the antenna module $12_1$ includes a dedicated microprocessor $402_1$, a dedicated modem $404_1$, and a directional antenna $406_1$; the antenna module $12_2$ includes a dedicated microprocessor $402_2$, a dedicated modem $404_2$, and a directional antenna $406_2$; the antenna module $12_{n-1}$ includes a dedicated microprocessor $402_{n-1}$, a dedicated modem $404_{n-1}$, and a directional antenna $406_{n-1}$; and the antenna module $12_n$ includes a dedicated microprocessor $402_n$, a dedicated modem $404_n$, and a directional antenna $406_n$. The antenna modules are connected to the main CPU 40 by the respective data and power links $40_1, \ldots, 40_n$ (see FIG. 2).

The microprocessor 402 and modem 404 offload from the satellite's main CPU 40 some of the more routine computational and formatting tasks involved in processing incoming and outgoing radio signals. In any given time interval in a particular route creation/data transmission cycle a satellite will receive and send large numbers of routing messages or receive and send myriad data communications. Signals received on the antennas 406 must be converted into the appropriate digital form for processing by the satellite's main CPU 40, and digital signals to be sent must be converted into the appropriate form for transmission by the antennas. Outgoing signals will typically be organized into packets of digital data prior to being converted into the appropriate form for transmission by a designated antenna. Likewise, demodulated incoming signals must be converted to the appropriate digital format for processing by the satellite's main CPU. The dedicated antenna modules 12 in the satellite 10' offload these more or less routine tasks that would otherwise have to be performed by the satellite's main CPU 40. For example, each microprocessor 402 can organize outgoing routing messages received from the CPU 40 for transmission into strings of bytes of digital data and store them in a queue for serial transmission by the associated antenna 406. This permits the more computationally intensive tasks described above involved in route creation and data transmission to be performed by the CPU in the time allotted for each portion of the route creation/data transmission cycle.

D. Route Creations in Systems with up to 300 Ground Stations

The limited time-slot route creation method disclosed in the previous section is effective for smaller satellite-based communications systems with up to about 100 terrestrial nodes. However, it would be advantageous in some applications create routes for transmitting data among more than 100 terrestrial nodes, perhaps between ground stations in different parts of the globe. This section describes alternatives to the limited time-slot method described above using as an example a route creation method using a constellation of 300 stochastically distributed VLEO satellites in substantially circular orbits at an altitude of about 300 miles. This lower altitude will facilitate the creation of radio links between the satellites and handheld terrestrial devices. The number of satellites used in the present embodiment will be chosen in accordance with principles described above relating to the probability of a particular satellite being able to link one or more of its antennas with antennas in one or more other satellites or with antennas in one or more ground stations, which in turn depends on the latitudinal extent of the constellation and the altitude of the satellites. In a typical application the satellite constellation will comprise 150 Type TR satellites and 150 Type RT satellites in stochastically distributed, uncontrolled orbits in the orbital path OT4 shown in FIG. 3, thus covering area of the earth between 45° N lat. and 45° S lat. The routing protocol in this section is based on adding links to a sub-route by applying unique algorithms in sequential time slots.

One aspect of the present system is its ability to support rapid creation of multiple radio links between terrestrial nodes and satellites and between two satellites. In a space-based communication system designed to be able to create satellite-to-satellite links rapidly, the routing protocol should be able to accommodate the delay between the transmission of a radio signal from one node and its reception by another due to the physical limitation imposed by the speed of light. This consideration is particularly applicable to transmissions between satellites. The exemplary routing protocol described in this section calls for the satellites to transmit/receive routing messages in multiple segments of each of a series of very short time slots of 100 milliseconds. Each 100 msec time slot comprises four 25 msec segments, the first three of which are dedicated to receiving radio signals from other system nodes, either orbiting or terrestrial. The fourth 25 msec segment is used for signal processing, described further below. (As in the system protocol described above in connection with FIG. 9, transmissions from terrestrial nodes that begin the route creation process are called "initial information signals." Subsequent transmissions from the satellites are referred to as "routing messages.") The GNSS module in each satellite and corresponding GNSS circuitry in the terrestrial nodes generate local clock signals synchronized system-wide to within no more than a 1.0 msec deviation.

Considering satellite-to-satellite communications, a satellite 3000 miles distant from a transmitting satellite will not begin to receive a routing message for 16 msecs from the time the transmission begins. That is, the speed of light is 186 mi/msec, whereby it will take about 16 msec for the transmitted routing message to reach a 3000-mile distant satellite. That leaves a 9 msec window for the receiving satellite to actually receive the data stream comprising the routing message and process it as described further below. If the satellites were in, say, 400 mile high orbits, the maximum distance between the satellites could be up to 3600 miles (see Table 1), and radio signals wouldn't reach the farthest distant satellite for over 19 msecs, which would substantially reduce the amount of time available for transmission and processing of the actual message. Conversely, the transmission time delay can be reduced by using satellites at an altitude less than 300 miles, but they will be subject to quicker orbital decay and thus increase system cost by requiring more frequent deployment of replacement satellites.

The present system will be described in connection with a system in which 100 routing messages comprising 10 bytes each are transmitted in each 25 msec segment. To be conservative in the present description, each byte is assumed to comprise 10 bits rather than the conventional eight to allow for the inclusion of additional content that might be required to effect the present system. (Routing message content is discussed further below.) For purposes of illustration the system is assumed to have a radio channel capacity (bandwidth) of 2 Mbps, so that 100 routing messages can be transmitted in 5 msec ($5 \times 10^{-7}$ sec/bit×10 bits/byte×10 bytes/routing message×100 routing messages). Added to a potential signal delay of up to 16 msec, this leaves a 4 msec margin of safety to ensure that the receiving satellites receive a complete set of the 100 routing messages.

Figure 11:
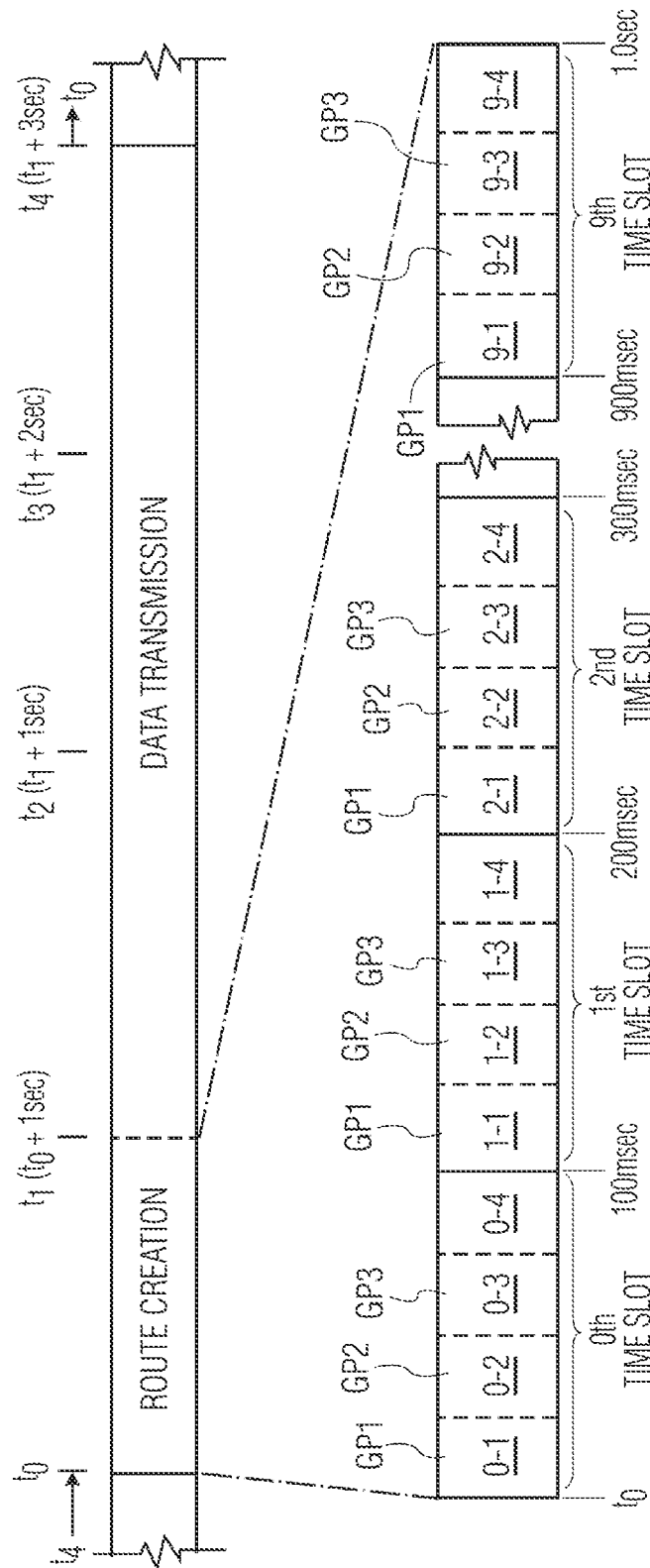
FIG. 11 illustrates a time-division route creation and data transmission method.

FIG. 11 is a timing diagram illustrating one four-second operational cycle employed by the system to create routes and transmit data over the routes. As in the system described in connection with FIG. 9, one route creation/data transmission cycle is four seconds long, for reasons explained in that description, with the first second devoted to route creation and the remaining three seconds used for transmitting data over the routes created in the first second. The route creation process is generally analogous to the recursive method described with reference to FIG. 9. As in FIG. 9, an operational cycle starts at to, with a route creation interval terminating at $t_1=1$ second and a three-second data transmission period terminating three seconds later at $t_4=t_1+3$ sec. Route creation takes place in a first ($0^{th}$) time slot, beginning with the transmission of initial information signals from the terrestrial nodes. However, in contrast to the process depicted in FIG. 10, the present embodiment divides the 300 terrestrial nodes into three groups, GP1, GP2, and GP3, of 100 nodes each. Some exemplary criteria for assigning terrestrial nodes to particular groups are described further below.

Referring to the $0^{th}$ time slot in FIG. 11, all of the terrestrial nodes transmit initial information signals in a series of 25 msec segments, one for each of the groups GP1, GP2, and GP3 of the terrestrial nodes. If the terrestrial node is a ground station with multiple antennas, it transmits the initial information signal on all of its antennas simultaneously. If the node is other than a ground station with multiple antennas, such as a portable handheld device, it transmits on all of its available antennas. (Handheld devices can be specially designed with multiple antennas to enhance the utility of the present system.) These initial information signals include address information uniquely identifying the terrestrial node (as in the initial information signals described in connection with FIG. 9), plus the identity of the group to which they belong. In the first 25 msec segment "0-1" of the $0^{th}$ time slot, all 100 terrestrial nodes in group GP1 simultaneously transmit initial information signals; in the second 25 msec segment "0-2" of the 0th time slot, all 100 terrestrial nodes in group GP2 simultaneously transmit initial information signals; and in the third 25 msec segment "0-3" of the $0^{th}$ time slot, all 100 terrestrial nodes in group GP3 simultaneously transmit initial information signals. In each of the first three 25 msec segments each satellite's route creation circuitry stores the identities of all of the antennas on which initial information signals were received, the "quality" of each received signal (described above in connection with FIG. 9), and the address of the associated terrestrial node that sent the signal. Each satellite associates these stored parameters with the corresponding group of terrestrial nodes. A preferred approach stores the initial information signals in memory locations indexed to the particular time slot in which the signals were received. Alternative approaches include storing with each initial information signal the identity of the group (GP1, GP2, GP3) from which it was sent, or the identity of the segment ("0-1," "0-2," or "0-3") during which it was sent.

During the fourth 25 msec segment "0-4" of the $0^{th}$ time slot the route creation circuitry in each satellite processes the received initial information signals associated with each group of terrestrial nodes in a manner analogous to the processing described above in connection with FIG. 9. For example, the identities of antennas that receive initial information signals below a certain quality are not stored, or if an initial information signal from a particular terrestrial node is received on more than one antenna, the route creation circuitry only stores the identity of the antenna on which the best quality signal was received, along with the quality itself and the identity of the terrestrial node that sent the associated initial information signal. The identity of any antenna that simultaneously received multiple initial information signals during a given segment is not stored.

Referring still to FIG. 11, the $1^{st}$ time slot (t=100 to 200 msec) is divided onto four 25 msec segments. In the first 25 msec segment 1-1 of the $1^{st}$ time slot each of the Type RT satellites that received initial information signals from GP1 terrestrial nodes transmits a first round of routing messages on all of their antennas. Each routing message includes the quality $Q_0$ of the (best) stored initial information signal for each terrestrial node and the address of the terrestrial node that sent it. It also knows the identity of the group to which the terrestrial node belongs by virtue of one of the approaches described in the previous paragraph. These first round satellites save the identity of the antenna associated with the initial information signal (but delete from memory the initial information signal quality) and the address of the associated terrestrial node. Any Type TR satellite that receives a first round routing message from a Type RT satellite during the segment 1-1 stores the identity of the antenna on which it was received, the quality $Q_0$ of the transmitted initial information signal and the address of the terrestrial node included in the associated routing message. The receiving satellite indexes the routing messages to the group associated with the received initial information signals by using one of the approaches described above. The same signal transmission protocol is performed in the second 25 msec segment 1-2 of the $1^{st}$ time slot vis-à-vis corresponding first round routing messages from Type RT satellites that received initial information signals from group GP2 terrestrial nodes, and likewise for the third 25 msec segment 1-3 for Type RT satellites that received initial information signals from group GP3 terrestrial nodes.

The fourth 25 msec segment 1-4 of the $1^{st}$ time slot is divided into three subsegments of 8 msec each. In the first subsegment each Type TR satellite that received a first round routing message associated with the group GP1 calculates a first combined quality Q, from the quality $Q_0$ of the initial information signal included in the first round routing message and the quality of the received first round routing message itself, by applying an algorithm like that described above in connection with FIG. 10. It stores the identity of the antenna on which it received the first round routing message and the address of the terrestrial node included in the received routing message. These parameters are associated with the group to which the terrestrial node belongs by one of the approaches already discussed. The satellite's route creation circuitry then stores the identity of the antenna associated with the highest first combined quality $Q_1$, along with the corresponding terrestrial node address and the group (time slot) to which it belongs. In a preferred implementation, no other information relating to that terrestrial node is stored. A corresponding processing/transmitting protocol is performed during the second 8 msec subsegment for first round routing messages received by Type TR satellites identified with the group GP2 terrestrial nodes, and likewise for the third 8 msec subsegment vis-à-vis first round routing messages identified with group GP3 terrestrial nodes.

The $2^{nd}$ 100 msec time slot (t=200 to 300 msec) is likewise divided into four 25 msec segments 2-1, 2-2, and 2-3. During each of these segments all of the Type TR satellites transmit, in turn by group, second round routing messages from all of their antennas. (Recall that the transmission from the first round satellites can require up to 21 msec from the time it is begun at one satellite and is completely received at another.) Each second round routing message comprises the address of the terrestrial node and the first combined quality included in a received first round routing message. The receiving satellite indexes the received second round routing messages to the group associated with the terrestrial node address. The same signal transmission protocol is performed in the second 25 msec segment 2-2 of the second time slot vis-A-vis corresponding second round routing messages from Type TR satellites that received first round routing messages signals leading back to group GP2 terrestrial nodes, and likewise for the third 25 msec segment 2-3 for Type TR satellites that received first round routing messages leading back to group GP3 terrestrial nodes.

The fourth 25 msec segment 2-4 of the 2nd time slot is divided into three subsegments of 8 msec each. In the first subsegment each Type TR satellite that received a second round routing message associated with the group GP1 subsegment calculates a second combined quality $Q_2$ from the first combined quality $Q_1$ included in the stored second round routing message and the quality of the received second round routing message itself. It stores in the GP1 memory location the identity of the antenna on which it received the highest quality second round routing message, the corresponding value of $Q_2$, and the address of the terrestrial node included in that received second round routing message. It then erases from memory the address of the terrestrial node. A corresponding processing protocol is performed during the second 8 msec subsegment for second round routing messages received by Type TR satellites identified with the group GP2 terrestrial nodes, and likewise for the third 8 msec subsegment vis-à-vis second round routing messages identified with group GP3 terrestrial nodes.

This recursive routing protocol is repeated in subsequent time slots. For example, a third time slot (not shown) will involve transmitting from Type RT satellites third round routing messages based on the second round routing messages received during the first three 25 msec time slots transmitted by the Type TR satellites during the $2^{nd}$ time slot, and so forth. The present example extends through a $9^{th}$ time slot from t=900 msec to the end of the route creation interval at $t_1$=1.0 sec. This last time slot, being an odd number, will transmit its routing messages from Type RT satellites, as in the $1^{st}$ and $3^{rd}$ time slots. (The subsegment labeled "9-4" is not used in the present example.)

At the end of the route creation interval ($t_1=t_0+1$ sec), every terrestrial node should have a preferred route to every other terrestrial node. That is, given the number of route creation time slots (nine in the present example), it can be expected that every terrestrial node will have received a final round of routing messages that includes at least one route to every other terrestrial node. In many cases a terrestrial node may have received on different antennas routing messages including the address of several other terrestrial nodes. In the present example, each routing message sent in the $9^{th}$ time slot will be processed by a terrestrial node in the same manner as a satellite that receives routing messages during the route creation interval. That is, the terrestrial node determines a final combined quality $Q_f$ based on the quality of the final round routing message itself and the quality of the previous round routing message included in the final round routing message. It stores the identity of the antenna on which it received the highest final combined quality for each of the other terrestrial nodes and associates it with the address of that node. Thus in accordance with the principles described above, data addressed to any other terrestrial node will automatically be transmitted on the antenna that will upload it to a satellite that has the preferred route to the other terrestrial node. It is also possible to implement the present system by associating the preferred routes by terrestrial node groups to provide three independent systems.

Route creation under this regime requires judicious placement of terrestrial nodes in a given group. In the present example a maximum of 100 nodes would be in a given group. The different groups should be somewhat balanced to reduce the chances that any one satellite will receive a disproportionate number of initial information signals from a given terrestrial node group. For example, this could be accomplished in a system serving northern Europe by assigning London, Berlin, and Paris to different groups. The same principle would advantageously be applied to other populous areas, such as the northeastern United States. As the routing process unfolds, the number of stored routing messages carried from a 100 millisecond time slot to a next time slot will inherently be less than the original 100. However, even though the maximum number of routing messages is automatically limited, the length of the suggested preferred routes may increase. In some implementations shorter routes (fewer links) will be chosen over a possible longer route that only marginally improves the overall quality of the route. As route creation proceeds, the number of destinations that can be reached from a given satellite begins to converge to the maximum number of routes. To improve efficiency all of the routing messages sent by a given satellite can be sent sequentially in a single batch. This will permit the inclusion of extra bytes for error detection and correction which apply to the entire batch rather than to each routing message, thus reducing the amount of data required to be sent by the satellites during route creation. In one implementation, each satellite node can maintain a table indicating which antenna to use for each destination terrestrial node, rather than adding to routing message length by including individual antenna information.

The present embodiment has numerous practical applications. For example, each group of terrestrial nodes can be used to support worldwide communications for subscribers with common interests. This could be business related, wherein an oil company could dedicate one system to monitoring conditions on drilling platforms, another to communications among a selected group of executives in various international locations, and another to personnel performing exploration activities. It could also comprise three dedicated email communication systems among groups of subscribers in various countries.

E. Route Creation with Satellites/Drones/Balloons at Different Altitudes

The routing methods and transmission protocols discussed in previous sections for supporting up to 300 ground stations will have various practical applications. However, creating links between the orbiting satellites and difficult to reach ground stations may limit the number of routes that can be created in a given time and thus adversely affect system performance. This can include ground stations within buildings or in low lying areas where the surrounding terrain limits the amount of the sky, and thus the number of satellites, visible to the ground station. One advantage of the approach described in this section is that it can take advantage of the ability of very low altitude aerial nodes (such as drones and/or balloons) to readily connect to difficult to reach ground stations, but which generally won't support longer distance radio links required for practical wide-area communications between ground stations hundreds or thousands miles apart. The system properties and routing and data transmission protocols in this section employ a hybrid system in which the aerial nodes exist in multiple cohorts at respective different altitudes.

One of the objects of the system described in this section is to enable worldwide route creation and data transmission within the limitations imposed by the amount of radio spectrum made available by government regulatory authorities. The assignee's unique routing protocols involve inter-nodal transmission of route-creating information signals (from terrestrial nodes to aerial nodes) and routing messages (from aerial node to aerial node and from aerial node to terrestrial node). System capacity can become an issue as the number of nodes sending and receiving these signals increases. The routing approach described in this section in effect treats users, nodes, route creation, route usage, and route timing as being in different complex frequency bands, complex different altitude ranges, and complex different geographic areas. The following describes a system that uses these concepts to provide a practicable worldwide system for transmitting data or supporting telephone calls over long distances among terrestrial locations all over the world.

1. System Arrangement.

Figure 12:
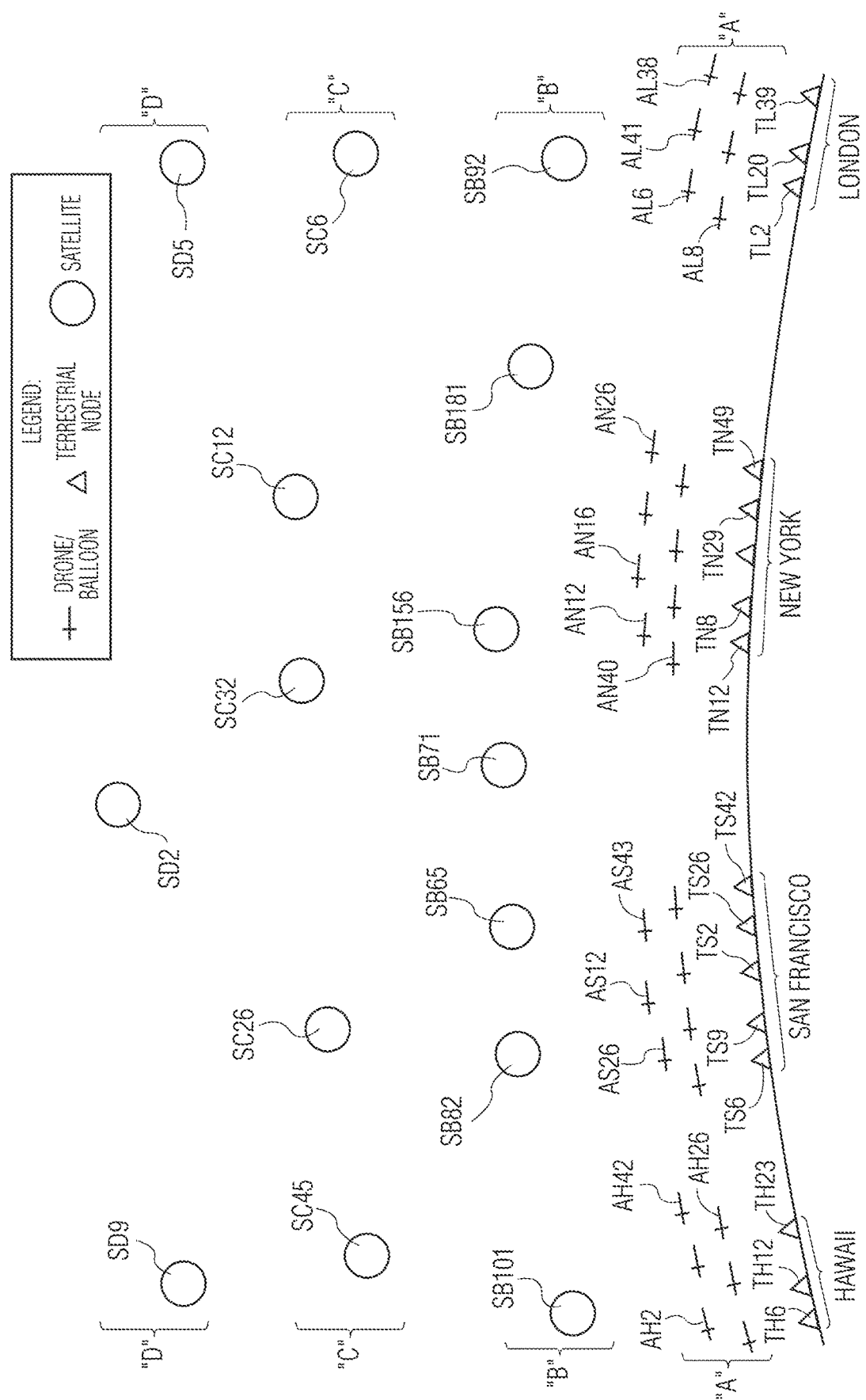
FIG. 12 is a not-to-scale representation of a communications system comprising aerial nodes of different types deployed in multiple cohorts at respective different altitudes.

FIG. 12 depicts an exemplary system representative of the present embodiment in which aerial nodes occupy respective levels "A," "B," "C," and "D," generally comprising four more or less distinct layers at different altitudes. One feature of this type system is that it can employ low-altitude, non-orbiting aerial nodes (drones and/or balloons) to service local clusters of ground nodes, while automatically transitioning to higher and higher altitude satellite nodes at levels B, C, and D for multi-layer communications routes over longer and longer distances. For example, as suggested by FIG. 12 (and described in more detail further below), separate groups of A level drones at altitudes of 10-20 miles could handle local-area communications over parts of Hawaii, San Francisco, New York City, and London, England. In FIG. 12 the terrestrial nodes are denoted by the letter "T" followed by a letter representing the local area ("H" for Hawaii, "S" for San Francisco, "N" for New York and "L" for London, England), and a numerical indicator signifying it as a particular one of the nodes in the local area. For example, TH6 and TH23 represent terrestrial nodes no. 6 and no. 23 in a local area covering Hawaii; TS6 and TS26 represent terrestrial nodes no. 6 and no. 26 in a local area covering San Francisco; TN12 and TN29 represent terrestrial nodes no. 12 and no. 29 in a local area covering New York; and TL2 and TL39 represent terrestrial nodes no. 2 and no. 39 in a local area covering London. For the sake of clarity, FIG. 12 only depicts a representative number of the terrestrial nodes in each local area, and only labels a representative number of the individual nodes.

While the exemplary system described here comprises four layers of aerial nodes, it will be appreciated as this description proceeds that it can also be readily implemented with a different number of layers, either more or fewer. In that regard, the number of layers would be partially dictated by the anticipated amount of traffic. The percentage of traffic destined for far-distant locations versus local traffic would also be important in the decision of how many layers to utilize for any given route. The detailed description that follows comprises a system with four layers or cohorts of nodes, identified per nomenclature defined just below. (The present description uses the terms "level" or "type" interchangeably with "layer" or "cohort," unless the context indicates otherwise). The assignee's '136 patent describes advanced routing protocols and satellite designs based on the fundamentals of the satellite communications approach described in preceding paragraphs. The present implementation involves deploying aerial nodes in layered cohorts in the following fashion:

Layer/Cohort A: Drones below an altitude 400 ft., or balloons and/or drones and/or airships at altitudes of 10-20 miles (see Table 1).

Layer/Cohort B: Very low earth orbit ("VLEO") satellites at altitudes of 200-400 miles. These satellites will see decaying orbits due to aerodynamic drag, but will retain their usefulness in the system until their orbits decay to about 100 miles in altitude. (See the assignee's U.S. application Ser. No. 17/367,663 describing satellites with a streamlined shape designed to maximize time in orbit of very low altitude satellites in the absence of onboard propulsion.)

Layer/Cohort C: Low earth orbit ("LEO") satellites at 800-1000 miles.

Layer/Cohort D: Satellites orbiting above 2,000 miles. In some applications, geostationary satellites can be included in this layer. (See Table 1.)

The routing protocols discussed in the subsection that follows permit the satellite cohorts to route easily among themselves, as in the exemplary implementation described there, which illustrates novel decision rules and methods by which the nodes themselves decide whether routing messages are directed toward nodes in a different layer (up or down) or in the same layer. Data transmissions thus also travel in routes that can have links between nodes in the same layer or in different layers. This type of multi-layer system will reduce the amount of routing traffic required to accommodate a given number of users comprising the terrestrial nodes. In one aspect of the previous discussions of time-slot route creation protocols, the creation of 10,000 routes among 100 terrestrial nodes was made practicable by collecting all of the routing messages sent by a particular satellite antenna into a single string. However, as a system expands the number of terrestrial nodes, the number of routing messages it is required to handle increases exponentially. For example, in a system with, say, 1,000 terrestrial nodes attempting to create one million routes, a routing message collection could contain up to 1,000 separate routing messages, which would overload the system's radio spectrum capacity. But as explained herein, a routing protocol that uses multiple layers of aerial nodes can decrease the routing message load, which in turn permits the system to support more terrestrial nodes.

In an example described above, a system comprising 100 terrestrial nodes capable of both originating and receiving data transmissions can create 10,000 routes using just 100 different virtual spanning trees of the type described in the '136 patent (see FIG. 6 and accompanying text; also referenced further above). Additionally, if a routing message contained 8-10 bytes, the maximum length of combined routing messages would only be 800-1000 bytes. However, because of the way spanning trees are created, whereby inferior quality routes are eliminated as trees are assembled, a typical collection of routing messages might only contain 300 to 600 bytes rather than the theoretical maximum of 1000 bytes. Limiting the number of bytes in internodal transmissions reduces battery power requirements and potential interference issues that may arise in the complex multi-layer routing and data transmission methods described herein.

A system with drone/balloon aerial nodes and satellites at different altitudes does not change the length and overall number of routing messages. But adding satellites at higher altitudes can reduce the number of links, which will result in higher bandwidth delivery and more stable routes. In a system including aerial nodes/satellites in cohorts (layers) at respective different altitudes, and in which each layer has its own routing mechanism, the number of potential destinations can be increased by the thousands. The unique routing protocols described in the next subsection for creating routes and transmitting data via a multi-layer system like that depicted in FIG. 12, is based on a postal zip code paradigm, in which a series of digits define smaller and smaller areas. For example, "0xxxx" denotes New England and New Jersey, "4xxxx" denotes the Midwest, etc. The next digit represents a state or part of a state; for example, "45xxx" denotes southern Ohio, and "43xxx" denotes central Ohio. The next digit can represent a central postal facility, such as "452xx," which denotes Cincinnati, Ohio, and environs. The final two digits denote a local post office; for example, "45231" denotes the local post office in Mt. Healthy, Ohio, a Cincinnati suburb.

An important feature of a multiple cohort system such as that described here, in which each cohort includes aerial nodes at altitudes within respective different ranges, is that routing decisions are made by nodes in the respective layers based on an address of an intended receiving ground station included in the routing messages. The principle is illustrated by considering a system in which the satellite constellation includes a very high altitude cohort or layer with satellites at altitudes of more than 2,000 miles (the "D" layer in FIG. 12), those satellites could create a route from one major continent to another, without utilizing lower layer nodes until the routing message was closer to the receiving terrestrial node addressed in the message. Then, as the message gets closer to the receiving terrestrial node, the route descends to a lower cohort, say of satellites between 800-1000 miles (the "C" layer in FIG. 12 in this example), which cover predetermined smaller "C" areas within the continent or other predetermined "D" areas covered by the "D" layer satellites. Next, as the routing message gets closer to the addressed terrestrial node, it descends to a satellite in the "B" layer (200-400 miles), in which each satellite covers a still smaller area within the predetermined "C" area. Finally, the routing message descends to a local "A" area, each node of which covers a portion of the larger "B" area, for final delivery to the receiving terrestrial node to which it is addressed. The "A" layer comprises a cohort of unmanned aircraft (drones) and/or balloons and/or airships at an altitude of at least 10 miles. The actual altitude of the drones/balloons/airships need not be strictly controlled, and they can actually occupy a range of altitudes, as long as they are above the minimum altitude set by FAA regulations to avoid interfering with civil aviation. Other embodiments can include drones at a maximum altitude of 400 feet as required by FAA regulations.

Further details regarding the construction and deployment of the various layers of aerial nodes follow.

Type A nodes in the embodiment depicted in FIG. 12 comprise solar powered, fixed-wing aircraft at an altitude of at least 60,000 ft. The drones (or other form of type A nodes) have conventional aerodynamic control surfaces and an on-board guidance system that communicates with a GNSS system for maintaining the drone in a predetermined, fixed flight path over a given local area. The drones may all be at substantially the same altitude, or as suggested by FIG. 12, occupy a range of altitudes depending on system requirements or the local surface topography. This proximity to the ground has two important advantages. The first is that it strengthens the signal strength between the drones and the ground, in the manner of cellular radio base station-to-consumer device links. This provides sufficient signal strength to penetrate obstacles such as automobile tops and the roofs of buildings. It also enables the use of highly focused antennas, which will permit different antenna beams to work with different users in close proximity to each other. Techniques such as spread spectrum modulation (i.e., code division multiple access) can also be used to minimize crosstalk between individual users. In FIG. 12 the type A drones are denoted by the letter "A" followed by a letter representing the local area ("H" for Hawaii, "S" for San Francisco, "N" for New York, and "L" for London, England), and a numerical indicator signifying it as a particular one of the drones in the particular local area. For example, AH2 and AH42 represent drones no. 2 and no. 42 in a local area covering Hawaii; AS26 and AS12 represent drones no. 26 and no. 12 in a local area covering San Francisco; AN26 and AN40 represent drones no. 26 and no. 40 in a local area covering New York; and AL8 and AL38 represent drones no. 8 and no. 38 in a local area covering London. For the sake of clarity, FIG. 12 only depicts a representative number of the drones in each local area.

Each type A node that participates in route creation and data transmission will require downward pointing antennas for forming radio links with terrestrial nodes in its coverage area, sideways pointing antennas to permit routing and data transmission with other drones, and upward pointing antennas to receive and transmit signals to the next level up, in this case layer B satellites. They would need to incorporate some attitude control to maintain them preferably to within 10° of horizontal to permit the downward pointing antennas to be effective. Fixed-wing aircraft with conventional aerodynamic control surfaces can be automatically operated by an onboard servo system to maintain level flight; hovering drones could also have conventional attitude control mechanisms and a servo system to the same purpose. Balloons would have some degree of natural stability, but the probabilistic manner in which radio links are formed and spanning trees are assembled permits some tolerance in horizontal stability. The drones and balloons will include solar panels for charging onboard batteries to power their electrical components. The solar panels will be positioned so they will be exposed to sunlight on about 180° of the semi-spherical space above the drone or balloon.

Type B satellites are intended to cover a larger area that in a typical implementation will permit the creation of routes between drones in different local areas. The satellites need downward pointing antennas capable of finding type A nodes (drones), sideways pointing antennas for linking with other type B satellites, and upward pointing antennas for receiving and sending routing messages (and data transmissions) to type C satellites. Type B nodes can comprise satellites in stochastic orbits without altitude control, as described in the '136 patent, and/or satellites maintained in preplanned fixed-orbits. Since fixed-orbit satellites may be used in many satellite systems currently under consideration, there may be some operational and cost advantages to using them in systems such as those described here. The methods of attitude stabilization using the earth's magnetic field described in the '136 patent (see FIGS. 16 and 17 and accompanying text) can be applied to satellites in all of the layers. If the satellites are rotating (see FIGS. 11A-11C of the '136 patent and accompanying text), their angular velocity will preferably be less than one revolution per minute. The satellites are denoted by the letter "S" followed by a layer designation ("B," "C," or "D") and a number of an individual satellite. For example, from left to right FIG. 12 depicts satellites SB101, SB82, SB65, SB71, SB156, SB181, and SB92. The system will include a sufficient number of satellites in stochastic orbits to provide a sufficient probability that links among the nodes at different levels can create the desired routes in the time allotted. The principles underlying the determination of how many satellites are needed to support route creation in the assignee's probability-based systems are set forth the '136 patent and others of the assignee's referenced patents and applications. It is anticipated that a constellation of 200 satellites in cohort B will support the multi-level routing protocols described herein. The satellites in all of the layers will include solar panels for charging onboard batteries to power their electrical components. The solar panels will be positioned so they will be exposed to sunlight over about 180° of the semi-spherical space above the satellite.

Type C satellites orbit at altitudes of 800-1000 miles. If the satellites are in uncontrolled, stochastic orbits, they can be deployed at different altitudes within this range, but typically satellites in predetermined, fixed orbits will be maintained at the same altitude. Using fixed-orbit satellites may be advantageous for the same reasons discussed above in connection with the type B satellites. In either case this satellite cohort will be useful for routing over intermediate distances in order to enable route creation between different B layer satellites. They need horizontal antennas for routing with other layer C satellites, upward-pointing antennas for connecting to type D satellites in higher orbits, and downward pointing antennas for connecting to type B satellites. It is anticipated that a constellation of 50 satellites in cohort C will support the routing protocols described here. The naming convention described above is also used for layer C satellites, with satellites SC45, SC26, SC32, SC12, and SC6 denoting five of the satellites in this cohort.

Type D satellites are limited in number and are useful for creating links between C layer satellites to support long-distance communications, such as intercontinental data transmissions. Depending on the planned percentages of long distance traffic contemplated for the system, different satellite choices for the type D layer are possible. Geostationary satellites are one possibility, and stochastically distributed satellites are another option. Satellites in equally spaced polar orbits forming a grid over the earth's surface like certain satellite designs now in mass production could also be of value. Most systems would require a limited number of type D satellites, and their design will preferably be dictated by anticipated traffic loads. They need sideways pointing antennas and downward pointing antennas. The distance between them could be large, but because of their height above the earth, they will have a very long line of sight over the horizon presented by the curvature of the earth. It is anticipated that about ten satellites in cohort D will be sufficient to support the present multi-level protocol. FIG. 12 depicts three of the satellites SD9, SD2, and SD5.

2. Local and Wide Area Routing Protocols

Creating routes from one particular terrestrial node to another employs the zip code paradigm described above. The present description uses the term "zone designation" for five digits {x1,x2,x3,x4,x5} used to identify the zones or areas served by the different aerial node cohorts. The first digit designates wide-area regions that will be used in the routing protocol to be described when a routing message is directed to a D layer satellite in accordance with the routing protocol described herein. (It is roughly akin to a U.S. region identified by the first digit of a postal zip code.) The following are examples of wide-area regions covering the globe designated by the digit x1:

x1=1: Europe incl. Great Britain to 60° W longitude (excludes India)

x1=2: Eastern Eurasia, China, and Pacific Oceana north of the equator x1=3: North America and Atlantic Oceana north of the equator x1=4, 5, 6: Regions of approximately equal area in a band north of the equator to about 30° N latitude, including Mexico, northern Africa, India, and Southeast Asia x1=7, 8, 9: Regions of approximately equal area including South America, Atlantic Oceana south of the equator, Sub-Saharan Africa, Indian Oceana, and Pacific Oceana south of the equator.

The next digit x2 represents subregions within each wide-area region participating in the routing protocol. The subregions are associated with the C layer satellites, which allows for up to ten subregions (x2=0 to 9) for each wide area region. The next digit x3 represents extended local regions within each subregion. The extended local regions are associated with the B level satellites, which allows for ten extended local area regions (x3=0 to 9) within each subregion. The final two digits (x4,x5) designate individual drones in a local area, thus permitting the use of up to 100 drones (x4,x5=00-99) in a local area network. The drones and the satellites each store a look-up table with the longitudinal and latitudinal boundaries of the wide-area regions, the subregions, and the extended local areas. They also include GNSS circuitry as described above in connection with FIG. 2 that indicates the longitude and latitude of the drone or satellite at any given time, whereby the drone or satellite determines its location expressed in terms of the three-digit zone designation.

Local Area Data Transmission. In the present embodiment the routing process begins by implementing a local area routing protocol in which at a time t=0 every terrestrial node in the system transmits first-order initial information signals on all of their antennas in a radio frequency (or other signal format) that can be received only by the system's level A drones. These first-order initial information signals include the unique address of the sending terrestrial node. To minimize the possibility that drones in one local area will receive first-order initial information signals from drones in a different local area, the local area sizes are chosen so that drones in nearby local areas will not normally receive radio signals from terrestrial nodes in other local areas. The possibility of such crosstalk can be minimized or eliminated by judicious design of the local area configuration and the location of the drones within it such that the distance between any drone in one area to the closest terrestrial node in another is at least 200 mi. for drones at a 10 mile altitude. This is based on the theoretical 280-mile distance to horizon given in Table 1 above, together with an assumption that ground structures or topological features will likely limit the distance a drone can see at shallow angles to the earth's surface. Another approach would be to have local areas be hexagonal with adjacent local areas using different frequency bands (each with multiple channels) to prevent cross talk between adjacent local areas. The number of drones associated with a given local area will depend on factors like population density, the number of users the system is designed to handle, the topology of the local area, etc. It is expected that most local areas can be served by no more than about 50 drones, but more may be required in high traffic areas with a large population. As noted, the use of a two-digit code to identify the drones allows for up to 100 drones in a given local area.

Route creation proceeds in a fashion analogous to that described in connection with the flowchart in FIG. 9 and the accompanying description, except that the time periods there can be shortened due to the close proximity of the drones in comparison to the distances between satellites. For example, in the local area route creation process for creating routes among terrestrial nodes serving a local area, the step ST102 in FIG. 9A will begin at t=10 msec and last for 15 msec. That is, a drone receiving a first-order initial information signal will store the identity of the downward pointing antenna on which the first-order initial information signal was received and determine its quality by the criteria referred to in the description accompanying FIG. 9. At t=30 msec, drones that received first-order initial information signals transmit first-tier local area routing messages with the quality of the first-order initial information signal received by an antenna of the drone and the address of the terrestrial node from which the associated initial information signal was received. The process proceeds in the fashion described in connection FIG. 9, except that the duration of each step in the process can be shortened to 15 msec. The process proceeds in that fashion for as many steps as desired, as in the satellite-based routing process depicted in FIG. 9. It is anticipated that no more than seven 15 msec intervals (100 msec total) will be required during the local area route creation phase to create routes linking all of the terrestrial nodes in a given local area, considering the relatively few drones in each local area as compared to the number of satellites involved in FIG. 9's satellite-based routing protocol. This would be comparable to terminating the local area route creation process at the step ST112 in FIG. 9A.

The local-area region can now support data communications in the same fashion as a satellite-based route created according to the process described in connection with FIG. 9. That is, a terrestrial node that received a routing message from a drone knows the antenna to use as an originating node for transmitting data over the optimum route to a destination node address in the same local area. The data will comprise data packets with the data content and the address of the destination terrestrial node in the fashion already described in connection with single-level satellite routes described in preceding sections. In the present system, the address of the destination terrestrial node will include the zone designation $\{x1,x2,x3\}$ described above. When the drone linked to the originating terrestrial node has onboard data for transmission, it checks its look-up table to determine if the destination terrestrial node is in the same local area (that is, if it has the same three-digit zone designation as the originating node). If so, it transmits the data on the antenna the identity of which was stored during route creation during a data transmission phase described further below. If not, it sends the data via a wide area route created in accordance with the protocol described next.

Wide Area Data Transmission. Radio routes between different local areas, required for wide area data transmission via the multi-layer system depicted in FIG. 12, comprise independent inter-layer radio routes created during a wide area route creation phase following local area route creation. In an interval lasting 900 msec, that is, until t=1 sec, the nodes depicted in FIG. 12 create a plurality of two-layer, columnar spanning trees using a modified version of the spanning tree algorithmic method described in the '136 patent at column 17, line 45, to column 22, line 9 (with particular reference to FIG. 6). Starting at t=100 msec, first level routes are assembled from drones to B level satellites by sending first level wide-area initial information signals simultaneously from all of the upward pointing antennas of all of the drones. The first level initial information signals include the first three digits $\{x1,x2,x3\}$ of a sending drone's five-digit zone designation. (They do not include the address of the individual terrestrial nodes that were linked with sending drones during the local area route creation.) Based on the probabilistic principles discussed previously, multiple B level satellites should receive multiple first level wide-area initial information signals on their downward pointing antennas. That is, a given B level satellite might receive multiple first level initial information signals from different drones in a particular local area, or from drones in different local areas, or both. Using the digits $\{x1,x2,x3\}$ in the first level wide-area initial information signals, each B level satellite sorts the initial information signals into numerical order. Next, each satellite creates sets of zone designations having the same first two digits $\{x1,x2\}$. If the sorting process results in more than one set of initial information signals in which either of the first two digits are different, it indicates that there are a corresponding number of potential routes between that satellite and multiple local areas in multiple C level subregions. Based on the number of first level initial information signals in each set, the satellite will store the set with the greatest number and erase the remaining first level initial information signals associated with other potential routes.

Each B level satellite creates a columnar spanning tree to itself from all of the drones in each individual local area remaining after the sorting step. The resulting first level route creation process involves all of the worldwide local areas and results in up to 1,000 different columnar spanning trees, and a B level satellite can potentially connect to multiple local areas. The chances are that two B level satellites will have a route to the same local area.

Simultaneously (that is, beginning a t=100 msec), separate columnar spanning trees are created to C level satellites from B level satellites (and from C level satellites to D level satellites, as discussed just below). In this step, all level B satellites (whether they contain single or multiple routes to different local areas) transmit from their upward pointing antennas second level wide-area initial information signals that include the first three digits $\{x1,x2,x3\}$ of the sending drone. Based on the probabilistic nature of the system, most of the C level satellites will receive multiple second level initial information signals. Using the first digit $\{x1\}$ of the zone designations of the second level initial information signals, each C level satellite sorts the second level initial information signals into sets in which the first digit $\{x1\}$ can be different and erase the remaining first level initial information signals associated with other potential routes.

Next, using all of the remaining second level initial information signals, each C level satellite takes as a group all the C level satellites and all the B level satellites that remain to be considered. Then working through the groups remaining in the B and C satellite routes, a columnar spanning tree is created among all the B and C nodes that are involved in a single group. In some instances only one group might be involved, or if the B satellites are near borders to B satellites in other hierarchical digit sets, then multiple groups of routes are created. Thus, any remaining B level satellite or any C level satellite under consideration will know the optimum route between any B and any C satellite.

Columnar spanning trees are created between C level satellites and D level satellites by sending third level wide-area initial information signals from all of the upward pointing antennas of all of the C level satellites at t=100 msec. The third level initial information signals include the first two digits {x1,x2} of the zone designation, and will in most cases be received on different antennas of a given D level satellite. As noted previously, these D level satellites will have previously defined zones below them, and thus we only need to sort the third level initial information signals in an analogous manner to that applied to the first and second level initial information signals. Then, using all the C level and D level satellites that have initial information signals on board, spanning trees between all the C level and D level satellites in the manner described in the '136 patent as previously referenced.

During the same 900 msec interval starting at t=100 msec, a single level spanning tree is created to each D level satellite from other D level satellites in its line of sight by sending fourth level wide-area initial information signals from the D level satellites' sideways pointing antennas and applying the spanning tree algorithmic approach in the '136 patent referred to above. The columnar spanning trees will support data transmissions in both directions between B, C, an D level satellites, and the single level spanning trees will support data transmissions between D level satellites both directions.

The result is a look-up table in each drone and satellite of the identity of the antenna to use to send radio signals to nodes in an adjacent level. That is, each drone will store the identity of the antenna that provides the link with the best composite quality to a satellite in the B layer. The '136 patent, at column 19, line 28, to column 20, line 67, discloses various algorithms for calculating composite qualities based on the quality of a received signal and a quality included in the received signal is incorporated herein by reference. Conversely, the B layer will have stored the identity of its antenna associated with that link. Likewise, the satellites in the C and D layers will also know the antennas associated with the best quality links between each of them in both layers. Accordingly, each of the A, B, and C layers will know the antenna to use to transmit data to an adjacent layer. (If there are no drones within sight of a B level satellite in the local area region it occupies during a route creation interval—for example in a remote area or on a small island—a columnar spanning tree is created to the satellite directly from any terrestrial node in that region in a manner analogous to that described above regarding creating links between drones and B level satellites.)

The stability of the radio links between satellites in a multi-satellite route can affect the integrity of the data transmitted over that route. Space diversity, described in the '795 publication, will help in ensuring the integrity of data received at its destination, but the issue can also be addressed in the route creation process. A route of more stable links will provide more accurate data transmission, especially as the number of links (satellites) in a route increases. The concept of signal "quality" as a parameter indicative of satellite-to-satellite link stability is discussed in detail in the '136 patent and in the above description, which also discuss several ways to quantify this parameter and to select the optimum (best overall quality) route. Another potential measure of signal quality takes into account the Doppler shift in radio signals exchanged by the moving satellites.

When the antennas sending and receiving a radio signal are moving relative to each other—like two orbiting satellites—the Doppler effect causes a received signal to be on a different carrier frequency than the one on which it was transmitted. If system carrier frequencies are known, a large Doppler shift would likely indicate that the sending and receiving satellites are traveling at high speeds relative to each other, resulting in a link that might not be available shortly after it has been created because the antennas in the two satellites are no longer linked. Conversely, a small Doppler shift would indicate that the satellites are likely moving in the same general direction. This is not to say that the Doppler shift is not applicable to the choice of a satellite for a bent pipe route, but link stability in that case is not as important as it is in routes comprising multiple satellites. Thus, taking into account the Doppler shift in signals received by system nodes links when considering the signal quality can result in an overall increase in the stability of the links in the route. The Doppler shift exhibited by an incoming signal can be combined with other quality-indicative parameters by suitable algorithmic methods, or as the only such parameter.

With the columnar spanning trees in place, data transmission proceeds as follows. The interval between 100 msec and 1000 msec (100 msec$\leq$t$\leq$1.000 sec) comprises a 900 msec local area data transmission phase effected as described above that is carried out simultaneously with wide area route creation. To recap, in local area data transmission an level A drone that has data for transmission to a destination ground station first checks if the destination is in the same local area. If so, it uses the local area drone cohort to transmit the data to the destination. As a result of the local area routing process, the terrestrial node seeking to transmit the data already knows the antenna that provides the best quality link to a drone in level A.

However, if the zone designation indicates that the destination is not in same local area, the antennas identified during wide-area route creation are used to transmit the data in the three seconds following completion of route creation, that is, between t=1 sec and 4 sec (1 sec$\leq$t$\leq$4 sec), as in the data transmission cycle described above in connection with FIG. 9. The drones hold the data to be sent over a wide area route until t=1 sec, when they transmit it to the B level satellite on the antenna identified during route creation. Each B level satellite receiving the data compares the first three digits {x1,x2,x3} of the destination zone designation accompanying the data with the first three digits of the zone designation indicating the location of the B level satellite that received the data. If their first two digits are the same, the B level satellite transmits the data to the B level satellite in the extended local area to which the data is addressed that has a route (via one or more B level satellites) to the destination terrestrial node via one or more drones. That is, the B level satellite with the data on board transmits it to a drone with an antenna that was linked during route creation to the destination terrestrial node. The drone then transmits it to the destination terrestrial node as described above in connection with local area data transmission. If the third digit {x3} of the destination zone designation accompanying the data is different from the third digit or the zone designation indicating the location of the satellite, the B level satellite transmits the data on an antenna linked to a C level satellite with a route to the destination terrestrial node during route creation.

When a C level satellite receives the data, it compares the first two digits {x1,x2} of the destination zone designation accompanying the data with the first two digits of the zone designation indicating the location of the C level satellite that received the data. If their first digits are the same, the C level satellite transmits the data to a C level satellite that has a route (via one or more C level satellites) to the destination terrestrial node via one or more B level satellites and one or more drones. That is, the C level satellite with the data on board transmits it to a B level satellite with an antenna that was linked during route creation to a drone with an antenna that was linked during route creation to the destination terrestrial node (via one or more drones). The drone then transmits the data to the destination terrestrial node as described above in connection with local area data transmission. If the second digit {x2} of the destination zone designation accompanying the data is different from the second digit of the zone designation indicating the location of the C level satellite, the data is transmitted on a C level satellite antenna linked to a D level satellite with a route to the destination terrestrial node during route creation.

When a D level satellite receives the data, it compares the first digit {x1} of the destination zone designation accompanying the data with the first digit of the zone designation indicating the location of the D level satellite that received the data. If their first digits are the same, the D level satellite transmits the data to a C level satellite that has a route (via one or more C level satellites) to the destination terrestrial node via one or more B level satellites and one or more drones. That is, the D level satellite with the data on board transmits it to a C level satellite with an antenna that was linked during route creation to a B level satellite with an antenna that was linked during route creation to a drone with an antenna that was linked during route creation to the destination terrestrial node. The drone then transmits the data to the destination terrestrial node as described above in connection with local area data transmission.

If the first digit {x1} of the destination zone designation accompanying the data is different from the first digit of the zone designation indicating the location of the D level satellite, the D level satellite transmits the data on an antenna linked to a D level satellite that has a route (via one or more D level satellites) to the destination terrestrial node via one or more C level satellites, one or more B level satellites, and one or more drones. That is, the D level satellite that has a route to the destination terrestrial node transmits the data on board to a C level satellite with an antenna that was linked during route creation to a B level satellite with an antenna that was linked during route creation to a drone with an antenna that was linked during route creation to the destination terrestrial node. The drone then transmits the data to the destination terrestrial node as described above in connection with local area data transmission.

V. SUMMARY AND CONCLUSION

The present disclosure presents a variety of routing protocols that enable the transmission of large amounts of data over long distances via satellites in uncontrolled, stochastic orbits. In a particularly advantageous embodiment a routing approach treats users, nodes as being in complex different geographical areas and route creation and route usage (for data transmission) and routing and data transmission timing as being in complex different frequency bands. This embodiment enables rapid transmission of data over worldwide routes. Creating space-based worldwide radio communications systems in which routes, with optional drones serving local areas, are created in one second requires various unique algorithms as described herein. The routes can be created via satellites in preplanned orbits, or more advantageously, via satellites in uncontrolled orbits.

Those skilled in the art will readily recognize that only selected preferred embodiments of the invention have been depicted and described, and it will be understood that various changes and modifications can be made other than those specifically mentioned above departing from the spirit and scope of the invention, which is defined solely by the claims that follow.

What is claimed is:

1. A radio communication system capable of providing a radio route for transmitting data to terrestrial nodes via aerial system nodes including a plurality of orbiting satellite nodes and a plurality of non-orbiting aerial nodes at altitudes up to 20 miles, wherein:
    each aerial system node includes an antenna construction for transmitting and receiving radio signals in a plurality of directions;
    a number of said non-orbiting aerial nodes occupy each of multiple local areas around the earth, each said local area corresponding to an area having at least one terrestrial system node located therein;
    said orbiting satellite nodes are disposed in orbital paths over said local areas;
    each non-orbiting aerial node includes route creation circuitry for determining a quality associated with an initial routing message received from a sending terrestrial node indicating the suitability of including the non-orbiting aerial node and said sending terrestrial node as a radio link in the radio route, said initial routing messages including an address of said sending terrestrial node and the identity of the local area where it is located; and
    each orbiting satellite node includes route creation circuitry for determining a composite quality associated with the quality of a further routing message received from a non-orbiting aerial node and the initial routing message quality included in said further routing message, said composite quality indicating the suitability of including the orbiting satellite and the non-orbiting aerial node as a radio link in the radio route, said further routing messages including the address of said sending terrestrial node and the identity of the local area where it is located.

2. The radio communication system in claim 1, wherein up to 100 non-orbiting aerial nodes are located in each said local area.

3. The radio communication system in claim 1, wherein said radio route includes a plurality of non-orbiting aerial nodes.

4. The radio communication system in claim 3, wherein the non-orbiting aerial nodes comprise unmanned aerial vehicles and unmanned lighter-than-air balloons.

5. The radio communication system in claim 4, wherein the non-orbiting aerial nodes include at least one of (a) plural lighter-than-air balloons, (b) plural lighter-than-air airships, and (c) plural heavier-than-air aircraft.

6. The radio communication system in claim 1, wherein the radio route includes at least one radio link between two of said orbiting satellite nodes.

7. The radio communication system in claim 1, wherein a first plurality of said non-orbiting aerial nodes are at altitudes below the maximum permitted by governmental regulations and a second plurality of said non-orbiting aerial nodes are at altitudes above commercial aviation.

8. The radio communication system in claim 1, wherein said radio route includes at least one radio link between two of said non-orbiting aerial nodes and at least one radio link between an orbiting satellite node and a non-orbiting aerial node.

9. The radio communication system in claim 1, wherein non-orbiting aerial nodes in one local area do not receive radio signals from non-orbiting aerial nodes in other local areas.

10. The radio communication system in claim 9, wherein said non-orbiting aerial nodes transmit and receive routing messages in respective different radio signal formats in adjacent local areas.

11. The radio communication system in claim 10, wherein said non-orbiting aerial nodes transmit and receive routing messages on respective different frequencies in adjacent local areas.

12. The radio communication system in claim 10, wherein adjacent local areas are hexagonal.

13. The radio communication system in claim 1, wherein said non-orbiting aerial nodes comprise a first node type for transmitting radio signals only in a first frequency band and simultaneously receiving radio signals only in a second frequency band different from said first frequency band, and a second node type for transmitting radio signals only in said second frequency band and simultaneously receiving radio signals only in said first frequency band, both of said frequency bands including multiple channels.

14. The radio communication system in claim 1, wherein the quality is signal strength.

15. The radio communication system in claim 14, wherein said routing messages are transmitted on a known frequency and said route creation circuitry in said aerial system nodes adjusts the quality of received routing messages based on deviations from said frequency caused by Doppler shift.

16. The radio communication system in claim 1, wherein said orbiting satellite nodes include plural satellites in each of multiple orbital altitudes.

17. The radio communication system in claim 1, wherein the maximum altitude of said non-orbiting aerial nodes is above commercial aviation and the maximum altitude of said orbiting satellite nodes is substantially equal to 200 miles.

18. The radio communication system in claim 1, wherein said aerial system nodes occupy multiple layers at respective different altitudes, wherein:
   an A layer comprises non-orbiting aerial nodes deployed at altitudes above commercial aviation;
   a B layer comprises orbiting satellite nodes at altitudes above said A layer at a maximum altitude substantially equal to 400 miles;
   a C layer comprises orbiting satellite nodes at altitudes above said B layer at a maximum altitude substantially equal to 1,000 miles;
   a D layer comprises orbiting satellite nodes at altitudes greater than 2,000 miles.

19. The radio communication system in claim 18, wherein said D layer includes at least one satellite in a geosynchronous orbit.

20. The radio communication system in claim 1, wherein said identity of the local area of a sending terrestrial node comprises a three-digit code [x1,x2,x3], with the value of x1 representing one of multiple a wide-area regions of the earth, the value of x2 representing at least one multiple unique subregion within a particular wide-area region, and the value of x3 representing at least one unique local area within a particular subregion.

21. The radio communication system in claim 20, wherein up to 100 non-orbiting aerial nodes are located in each said local area and each non-orbiting aerial node in a given local area is identified by a unique code.

22. The radio communication system in claim 1, wherein said satellite nodes orbit the earth at a maximum altitude substantially equal to 200 miles.

23. The radio communication system in claim 1, wherein said satellite nodes orbit the earth in a band extending 5° north and south of the equator.

24. The radio communication system in claim 1, wherein said satellite nodes orbit the earth in a band extending 13° north and south of the equator.

* * * * *